(12) United States Patent
Sunata et al.

(10) Patent No.: US 10,585,590 B2
(45) Date of Patent: Mar. 10, 2020

(54) ELECTRONIC DEVICE, COMPUTER SYSTEM, AND CONTROL METHOD

(71) Applicant: Toshiba Memory Corporation, Minato-ku (JP)

(72) Inventors: Tetsuya Sunata, Yokohama (JP); Daisuke Iwai, Yokohama (JP); Kenichiro Yoshii, Bunkyo (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 16/126,084

(22) Filed: Sep. 10, 2018

(65) Prior Publication Data

US 2019/0294341 A1  Sep. 26, 2019

(30) Foreign Application Priority Data

Mar. 26, 2018  (JP) .................................. 2018-058610

(51) Int. Cl.
  *G06F 12/00*   (2006.01)
  *G06F 3/06*    (2006.01)
  *G06F 12/02*   (2006.01)

(52) U.S. Cl.
  CPC ............ *G06F 3/0608* (2013.01); *G06F 3/064* (2013.01); *G06F 3/0658* (2013.01); *G06F 3/0679* (2013.01); *G06F 12/0246* (2013.01); *G06F 2212/1044* (2013.01); *G06F 2212/2022* (2013.01)

(58) Field of Classification Search
  CPC ........................ G06F 3/0608; G06F 12/0246
  USPC ....................................................... 711/103
  See application file for complete search history.

(56) References Cited

U.S. PATENT DOCUMENTS

| 7,254,592 B1 *   | 8/2007  | Matero ................. G06F 9/466 |
| 2004/0205290 A1* | 10/2004 | Shinagawa ......... G06F 12/0246 711/103 |
| 2018/0032275 A1  | 2/2018  | Pahwa et al. |

\* cited by examiner

*Primary Examiner* — Jae U Yu
(74) *Attorney, Agent, or Firm* — Oblon, McClelland, Maier & Neustadt, L.L.P.

(57) ABSTRACT

According to one embodiment, an electronic device includes a nonvolatile memory that includes blocks and a controller. The controller transmits information to the host. The information indicates a first logical address range corresponding to cold data stored in the nonvolatile memory, and a processing amount for turning a cold block that comprises the cold data into a block to which data is writable. The controller reads the cold data from the nonvolatile memory in accordance with a read command that is received from the host and designates the first logical address range, and transmits the read cold data to the host. The controller writes, to the nonvolatile memory, the cold data that is received with a write command designating the first logical address range from the host.

20 Claims, 26 Drawing Sheets

| Block No. | Number of times of erase | Erase sequence No. | Valid data amount | ... |
|---|---|---|---|---|
| 0 | 20 | 1000 | 95 | ... |
| 1 | 30 | 3000 | 10 | ... |
| ⋮ | ⋮ | ⋮ | ⋮ | ⋮ |
| X | 1 | 100 | 95 | ... |
| ⋮ | ⋮ | ⋮ | ⋮ | ⋮ |
| m-1 | 20 | 2000 | 70 | ... |

F I G. 7

| Block No. | Processing time (processing amount) | OP collection amount | ... |
|---|---|---|---|
| X | 100 | 10 | ... |
| ⋮ | ⋮ | ⋮ | ⋮ |

F I G. 8

| Bit | Description |
|---|---|
| 31:04 | Reserved |
| 03:00 | Self-test Code (STC):This field specifies the action taken by Device Self-test command <table><tr><th>Value</th><th>Definition</th></tr><tr><td>0h</td><td>Reserved</td></tr><tr><td>1h</td><td>Start a short device self-test operation</td></tr><tr><td>2h</td><td>Start an extended device self-test operation</td></tr><tr><td>3h-Dh</td><td>Reserved</td></tr><tr><td>Eh</td><td>Vendor specific</td></tr><tr><td>Fh</td><td>Abort device self-test operation</td></tr></table> |

F I G. 9

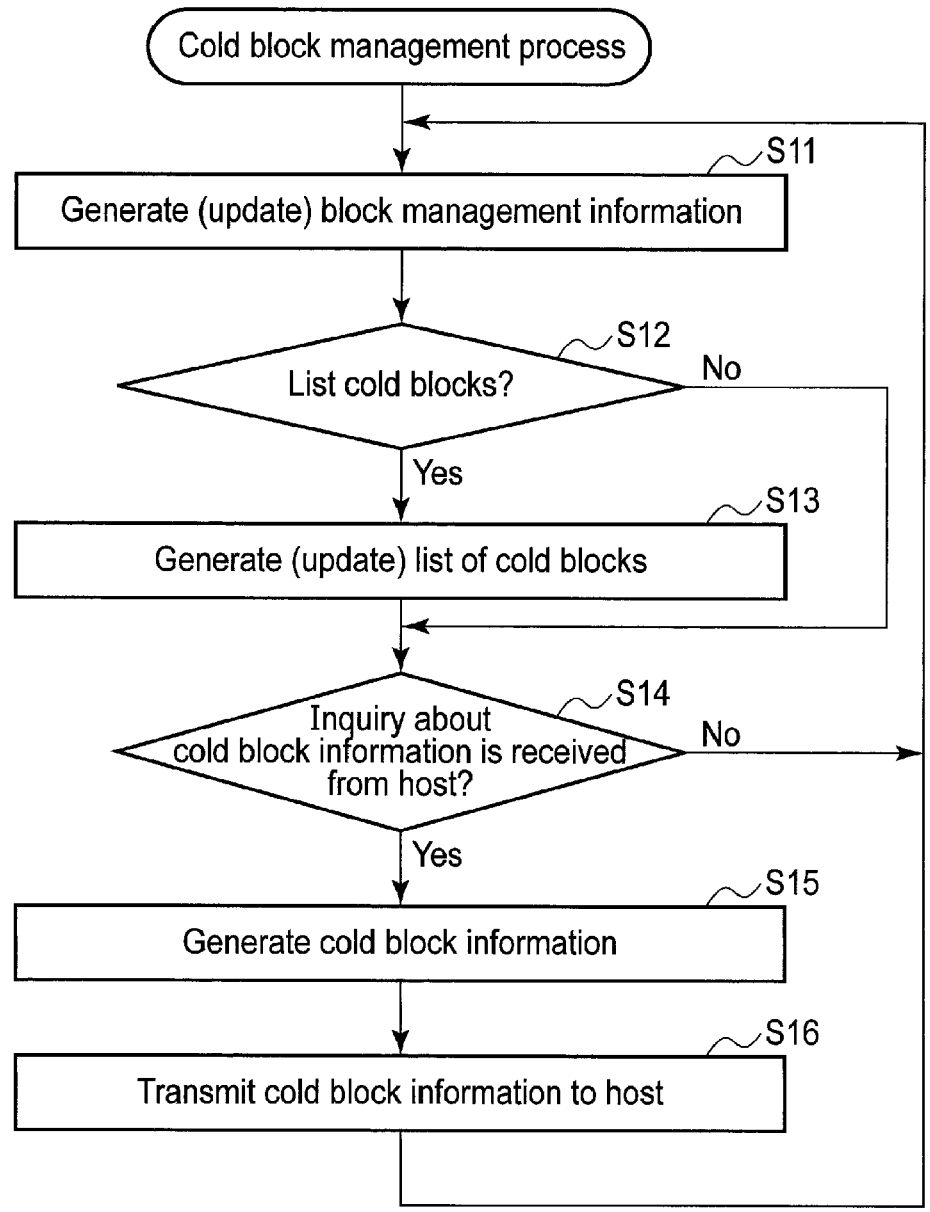
F I G. 10

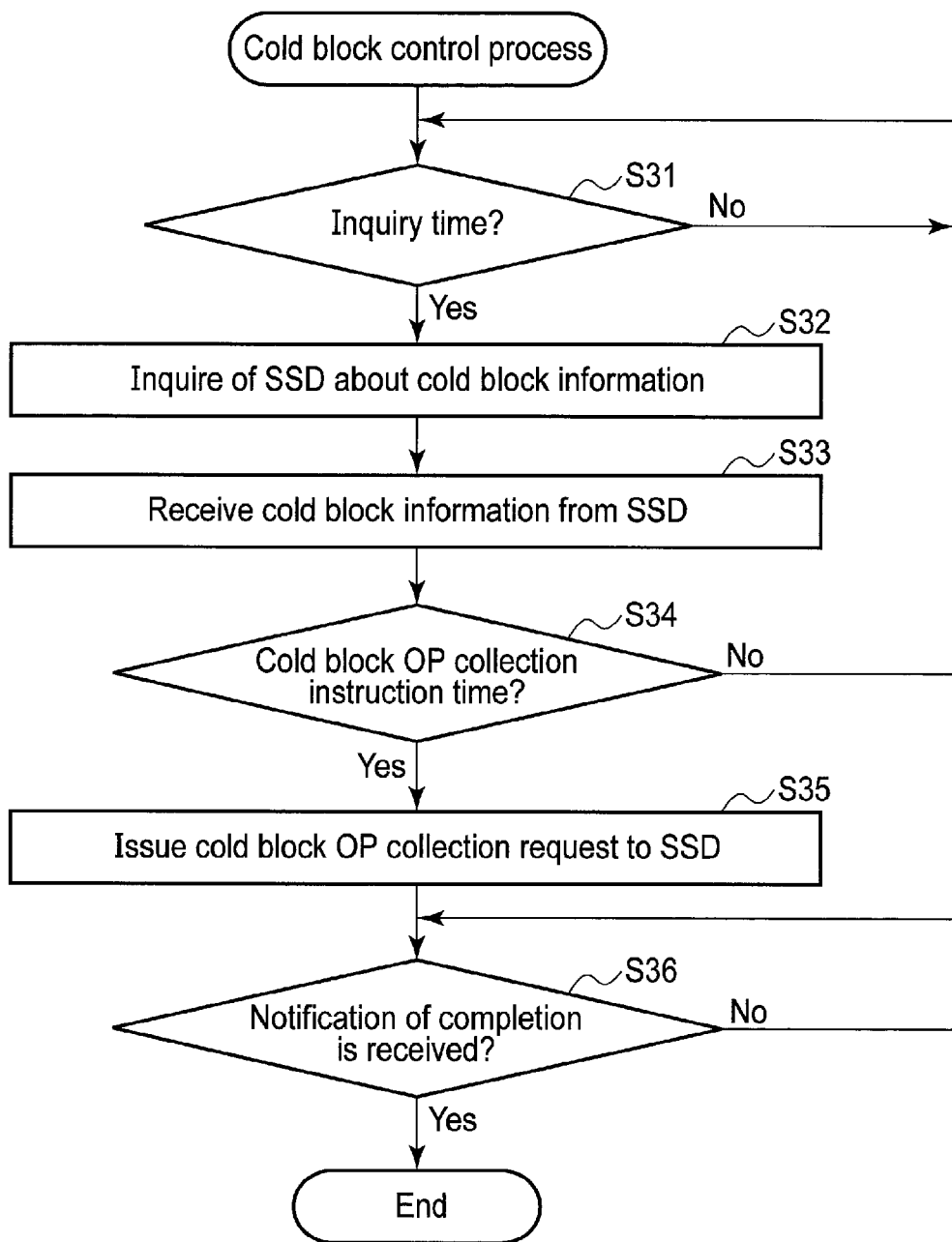
F I G. 12

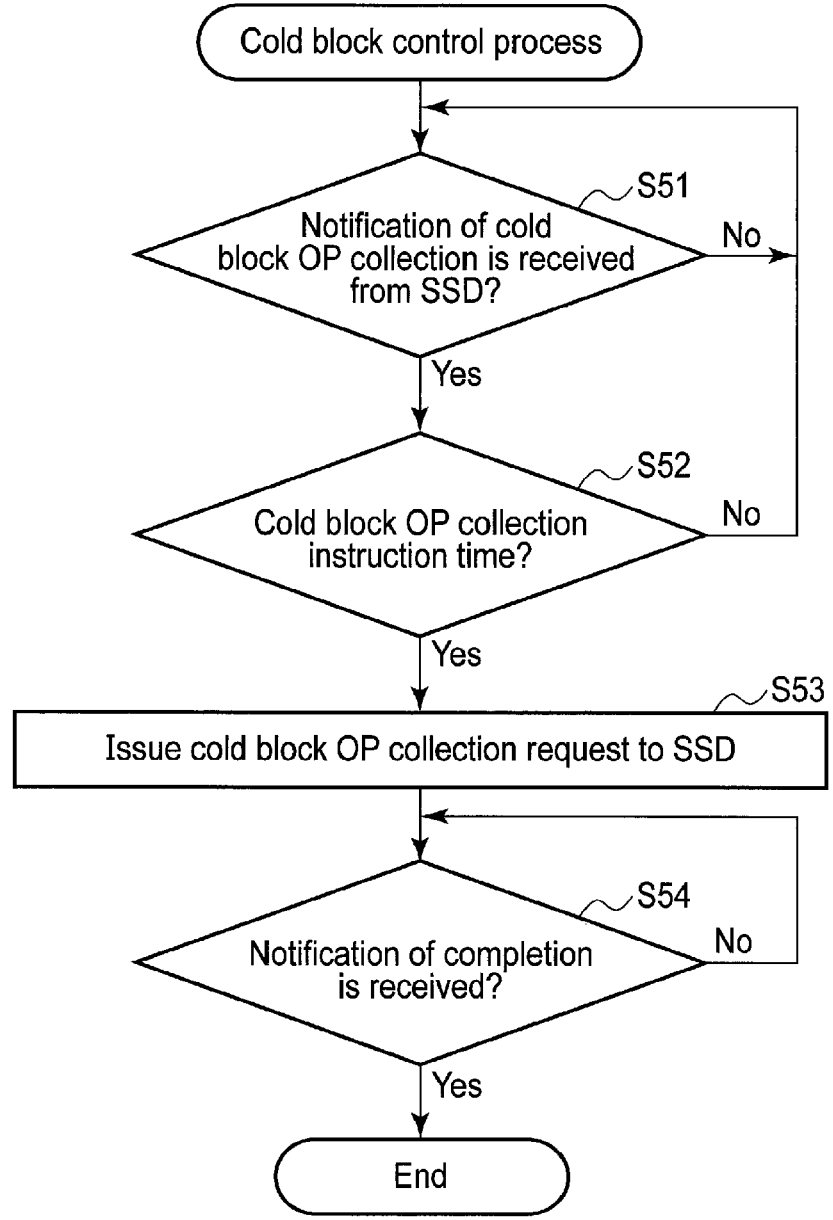
F I G. 14

| Range | Byte | Field |
|---|---|---|
| | | |
| Range 0 | 03:00 | Context attributes |
| | 07:04 | Length in logical blocks |
| | 15:08 | Starting LBA |
| | | |
| Range 1 | 19:16 | Context attributes |
| | 23:20 | Length in logical blocks |
| | 31:24 | Starting LBA |
| | ... | |
| | | |
| Range 255 | 4083:4080 | Context attributes |
| | 4087:4084 | Length in logical blocks |
| | 4095:4088 | Starting LBA |

16byte×256=4 KiB for ranges 0 to 255

F I G. 16

| Attribute | Bits | Description | |
|---|---|---|---|
| AF: Access Frequency | 03:00 | Value | Definition |
| | | 0000b | No frequency information provided |
| | | 0001b | Typical number of reads and writes expected for this LBA range |
| | | 0010b | Infrequent writes and infrequent reads to the LBA range indicated |
| | | 0011b | Infrequent writes and frequent reads to the LBA range indicated |
| | | 0100b | Frequent writes and infrequent reads to the LBA range indicated |
| | | 0101b | Frequent writes and frequent reads to the LBA range indicated |
| | | 0110b — 1111b | Reserved |

F I G. 17

| Starting LBA | Length(NLB) |
|---|---|
| 0 | 10 |
| 11 | 9 |
| 100 | 100 |
| 500 | 80 |
| ... | ... |
Add LBAs (surrounding LBAs) corresponding to data estimated as originally cold data →
| Starting LBA | Length(NLB) |
|---|---|
| 0 | 20 |
| 100 | 100 |
| 500 | 80 |
| ... | ... |
F I G. 21
| Starting LBA | Length(NLB) | Storage ID |
|---|---|---|
| 0 | 20 | 0001 |
| 100 | 100 | 0001 |
| 500 | 80 | 0001 |
| ... | ... | ... |
| Starting LBA | Length(NLB) | Storage ID |
|---|---|---|
| 0 | 20 | 0001 |
| 100 | 100 | 0001 |
| 500 | 80 | 0002 |
| ... | ... | ... |
F I G. 24

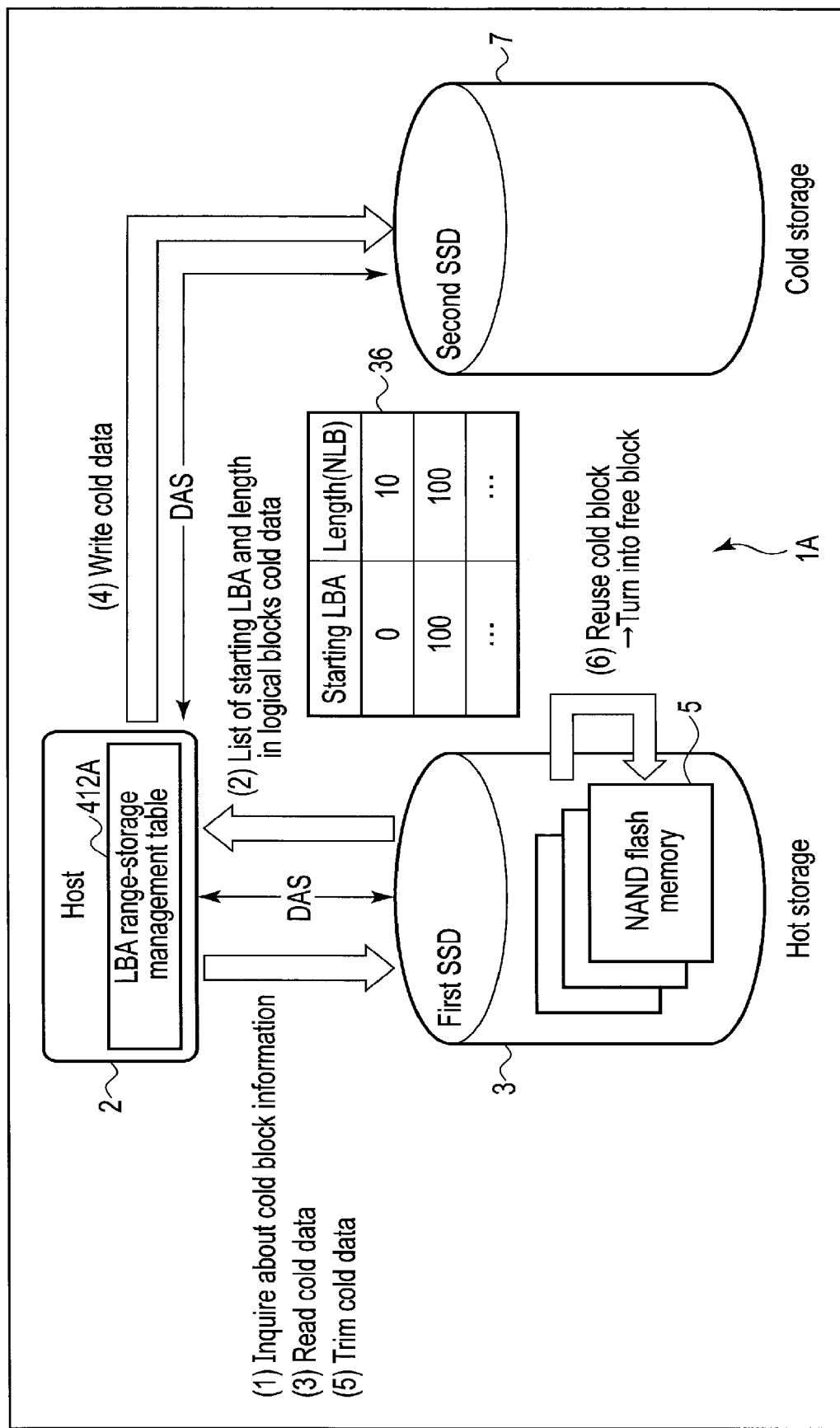
F I G. 23

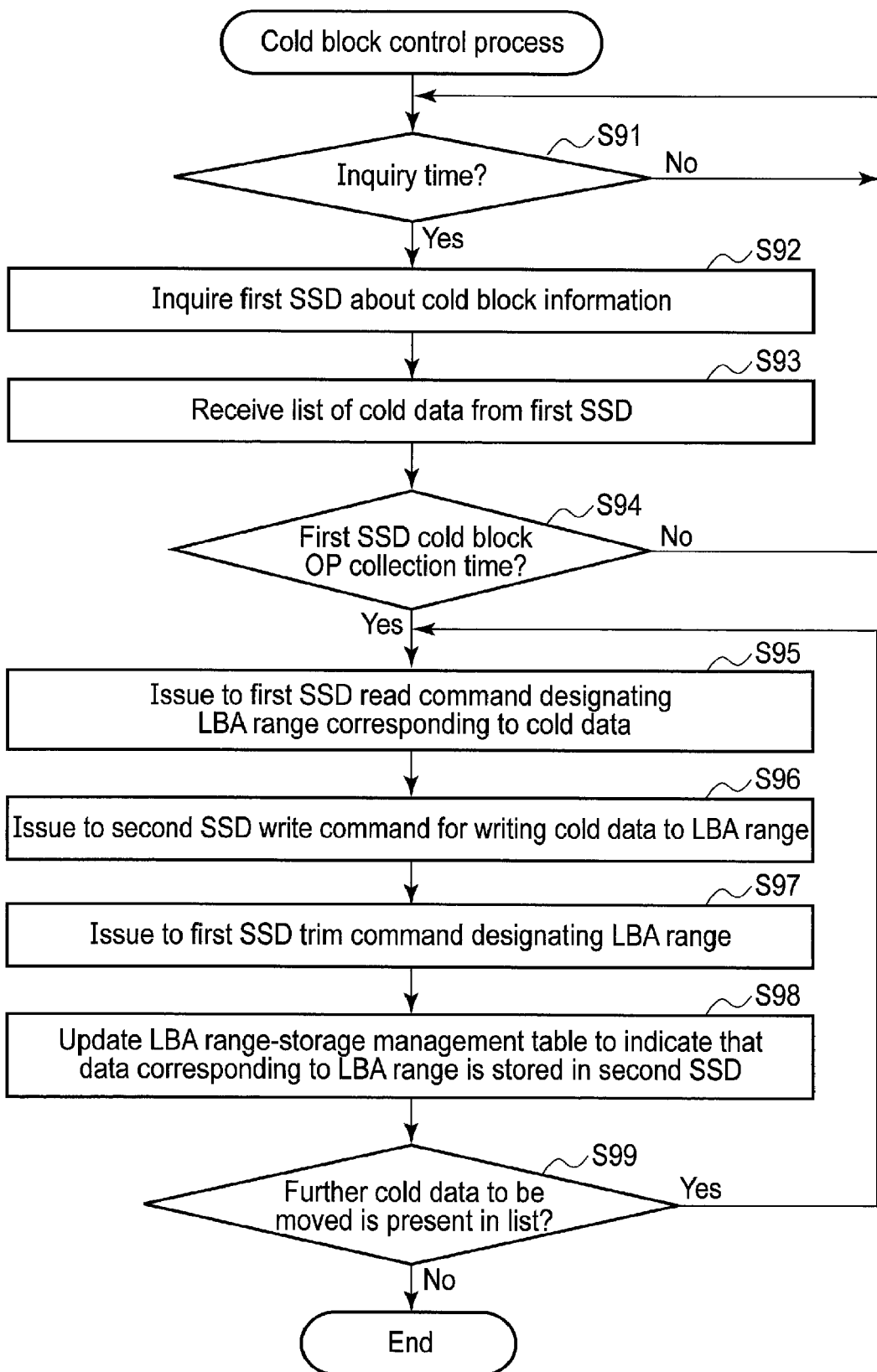
F I G. 25

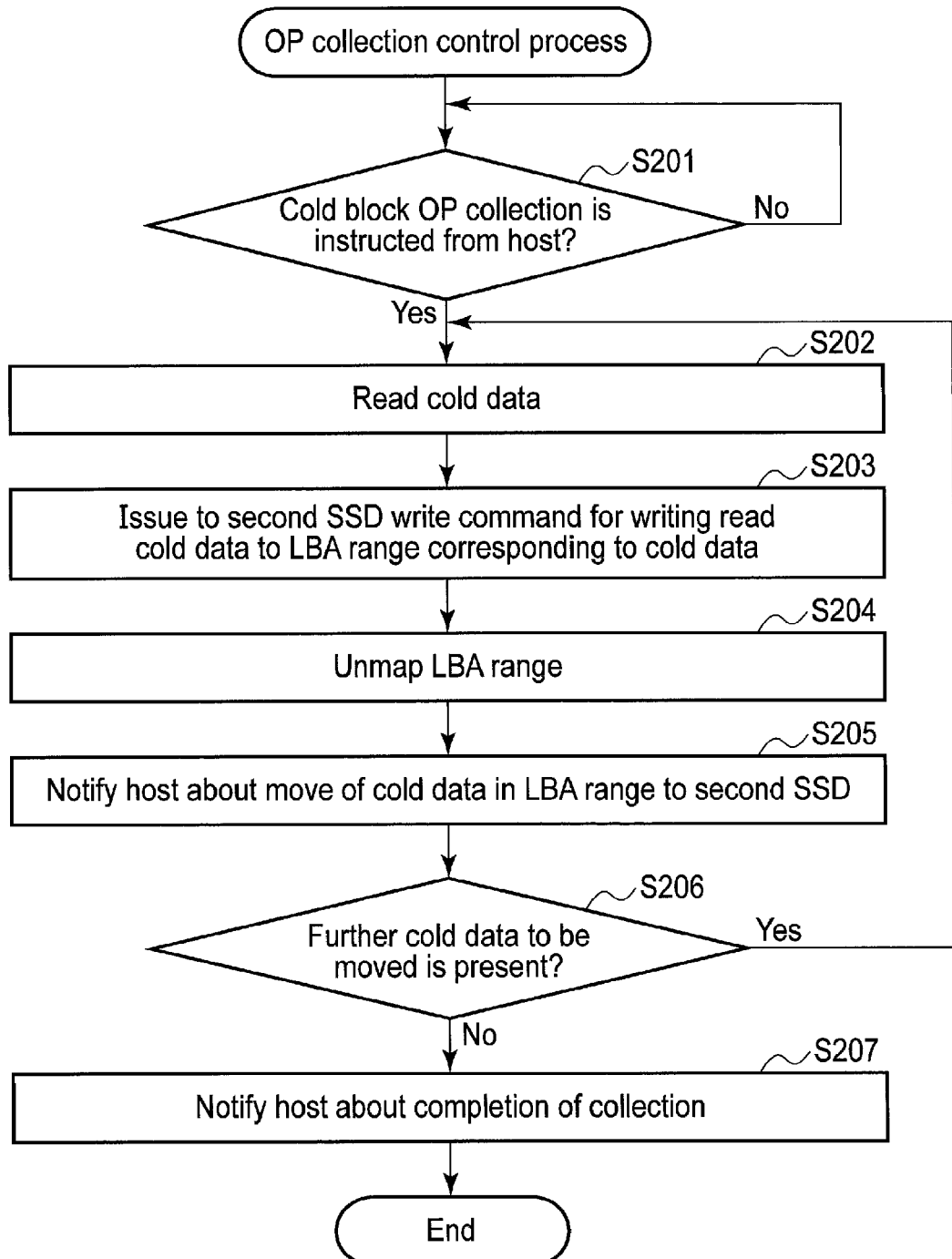
F I G. 28

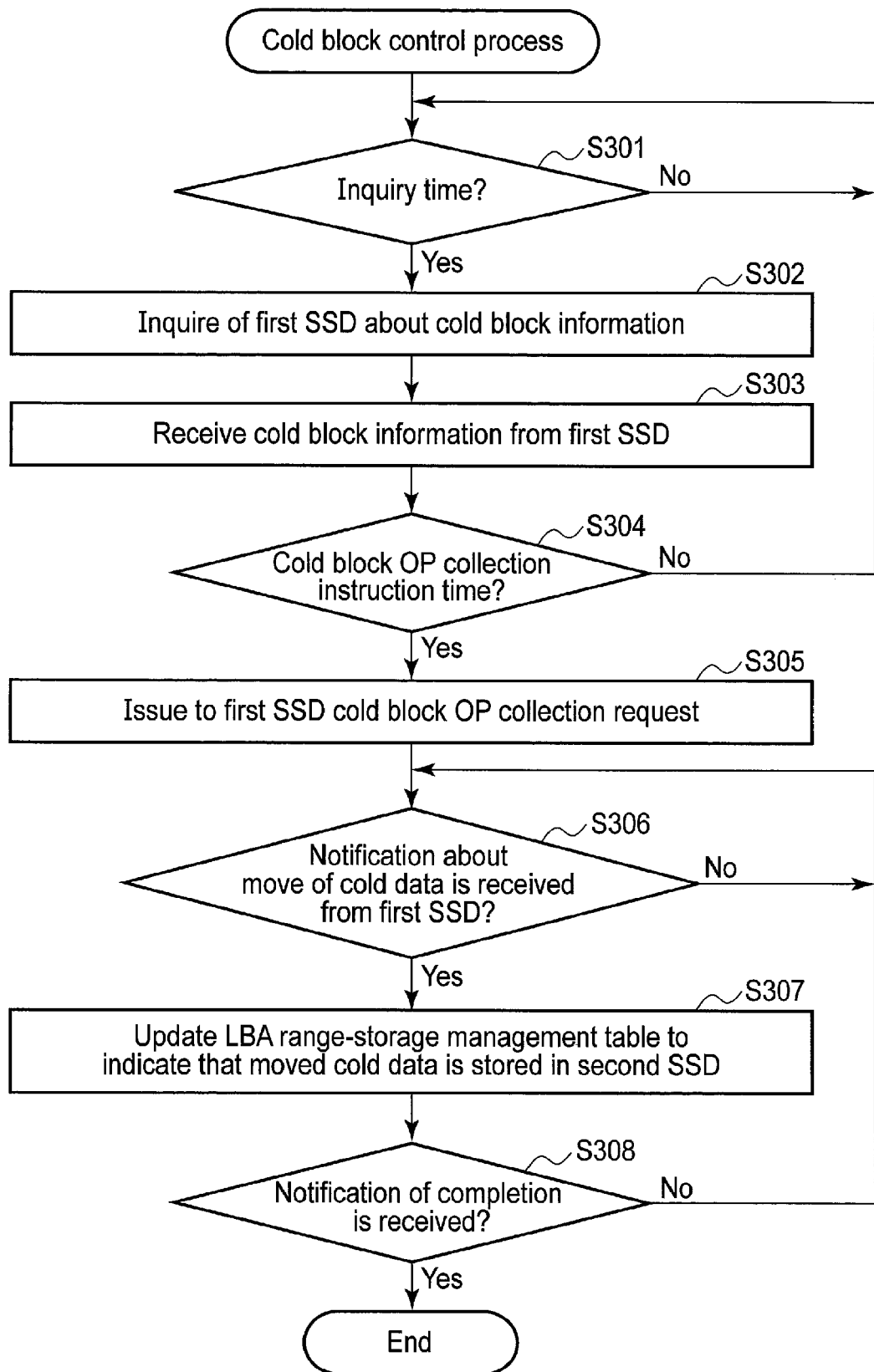
F I G. 29

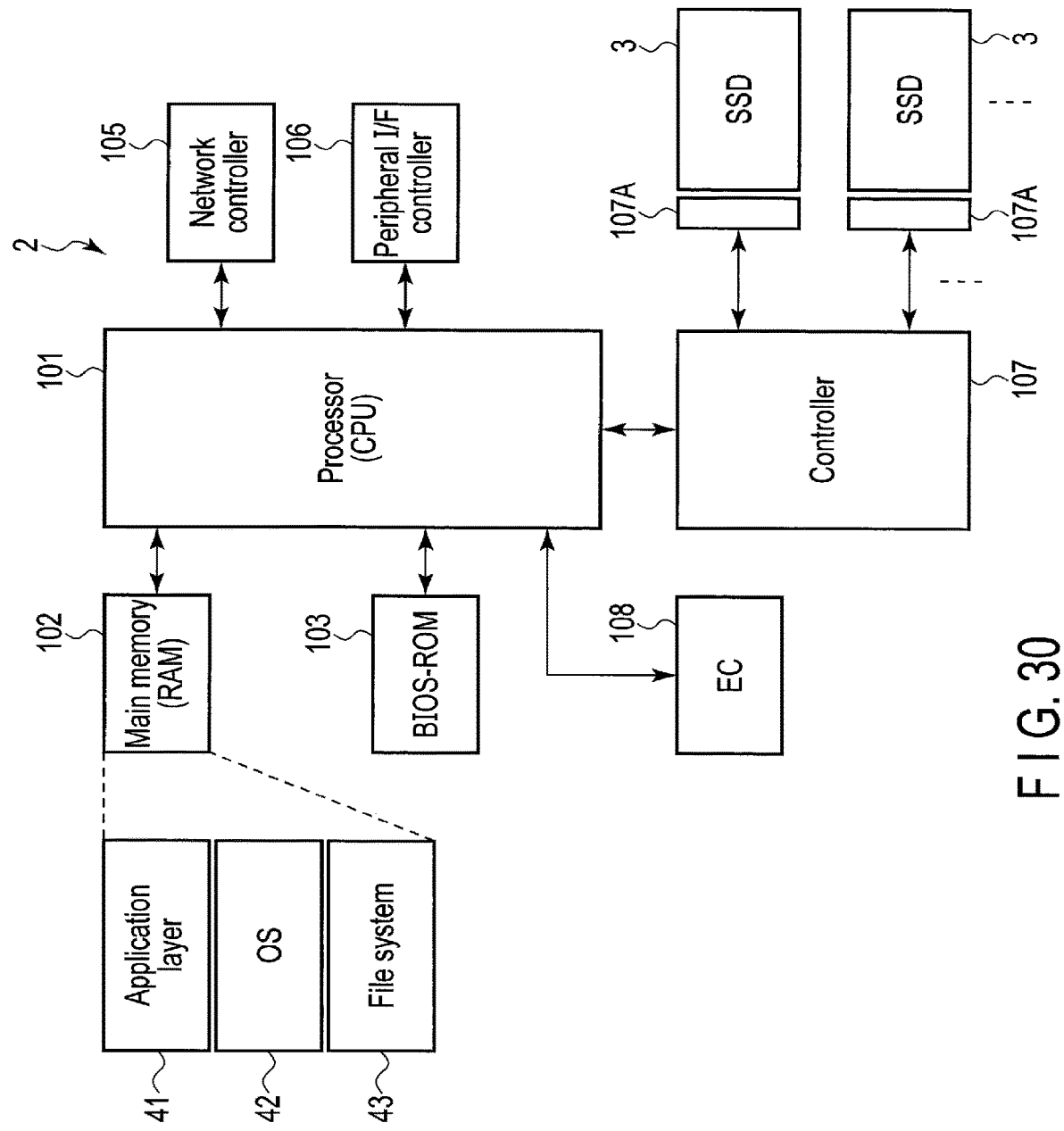
F I G. 30

ELECTRONIC DEVICE, COMPUTER SYSTEM, AND CONTROL METHOD

CROSS-REFERENCE TO RELATED APPLICATIONS

This application is based upon and claims the benefit of priority from Japanese Patent Application No. 2018-058610, filed Mar. 26, 2018, the entire contents of which are incorporated herein by reference.

FIELD

Embodiments described herein relate generally to an electronic device and a computer system including a nonvolatile memory, and a control method thereof.

BACKGROUND

Storages each including a nonvolatile memory have been widely used in recent years.

One of these storages currently known is a solid state drive (SSD) including a NAND flash memory. The SSD is used as a main storage for various types of computing devices.

The SSD performs a garbage collection (GC) operation to move valid data in a garbage collection source block (GC source block) to a garbage collection destination block (GC destination block), and to generate a free block. After an erase process is subjected to the free block, the free block is available as a new write destination block.

For example, a block containing a small amount of valid data is selected as the GC source block. By selecting such a GC source block, a larger number of free blocks can be efficiently generated.

On the other hand, a block containing a large amount of valid data is unlikely to be selected as a GC source block. Accordingly, redundant capacity (over provisioning (OP)) corresponding to invalid data areas in the block remains unavailable for data writing. When a large number of blocks each containing a large amount of valid data, a large number of invalid data areas are therefore present.

BRIEF DESCRIPTION OF THE DRAWINGS

FIG. 7 is a diagram illustrating a configuration example of block management information used by the computer system of the first embodiment.

FIG. 8 is a diagram illustrating a configuration example of cold block information used by the computer system of the first embodiment.

FIG. 9 is a diagram illustrating a format example of a command used for requesting collection of OP in a cold block in the computer system of the first embodiment.

FIG. 10 is a flowchart showing an example of the procedure of a cold block management process executed by a solid state drive (SSD) included in the computer system of the first embodiment.

FIG. 12 is a flowchart showing an example of the procedure of a cold block control process executed by a host in the computer system of the first embodiment.

FIG. 14 is a flowchart showing an example of the procedure of a cold block control process executed by a host in the computer system of the second embodiment.

FIG. 16 is a diagram illustrating a format example of a list of cold data used by the computer system of the third embodiment.

FIG. 17 is a diagram illustrating a format example of an access frequency attribute included in a write command issued from a host to an SSD in the computer system of the third embodiment.

FIG. 21 is a diagram illustrating an example of adding, to an LBA range shown in a list of cold data used in the computer system of the fourth embodiment, LBAs (LBA range) that surround the LBA range in the list.

FIG. 23 is a diagram for explaining an example of an operation for collecting OP in a cold block in a computer system according to a fifth embodiment.

FIG. 24 is a diagram illustrating a configuration example of a management table used by the computer system of the fifth embodiment.

FIG. 25 is a flowchart showing an example of the procedure of a cold block control process executed by a host included in the computer system of the fifth embodiment.

FIG. 28 is a flowchart showing an example of the procedure of an OP collection control process executed by an SSD included in the computer system of the seventh embodiment.

FIG. 29 is a flowchart showing an example of the procedure of a cold block control process executed by a host included in the computer system of the seventh embodiment.

FIG. 30 is a block diagram illustrating a configuration example of a host.

DETAILED DESCRIPTION

Various embodiments will be described hereinafter with reference to the accompanying drawings.

In general, according to one embodiment, an electronic device connectable to a host via an interface includes a nonvolatile memory, and a controller electrically connected to the nonvolatile memory. The nonvolatile memory includes blocks. When the electronic device is connected to the host, the controller transmits information to the host. The information indicates a first logical address range corresponding to cold data stored in the nonvolatile memory, and a processing amount for turning a cold block that comprises the cold data into a block to which data is writable. The controller reads the cold data from the nonvolatile memory in accordance with a read command that is received from the host and designates the first logical address range, and transmits the read cold data to the host. The controller writes, to the nonvolatile memory, the cold data that is received with a write command designating the first logical address range from the host.

First Embodiment

Figure 1:
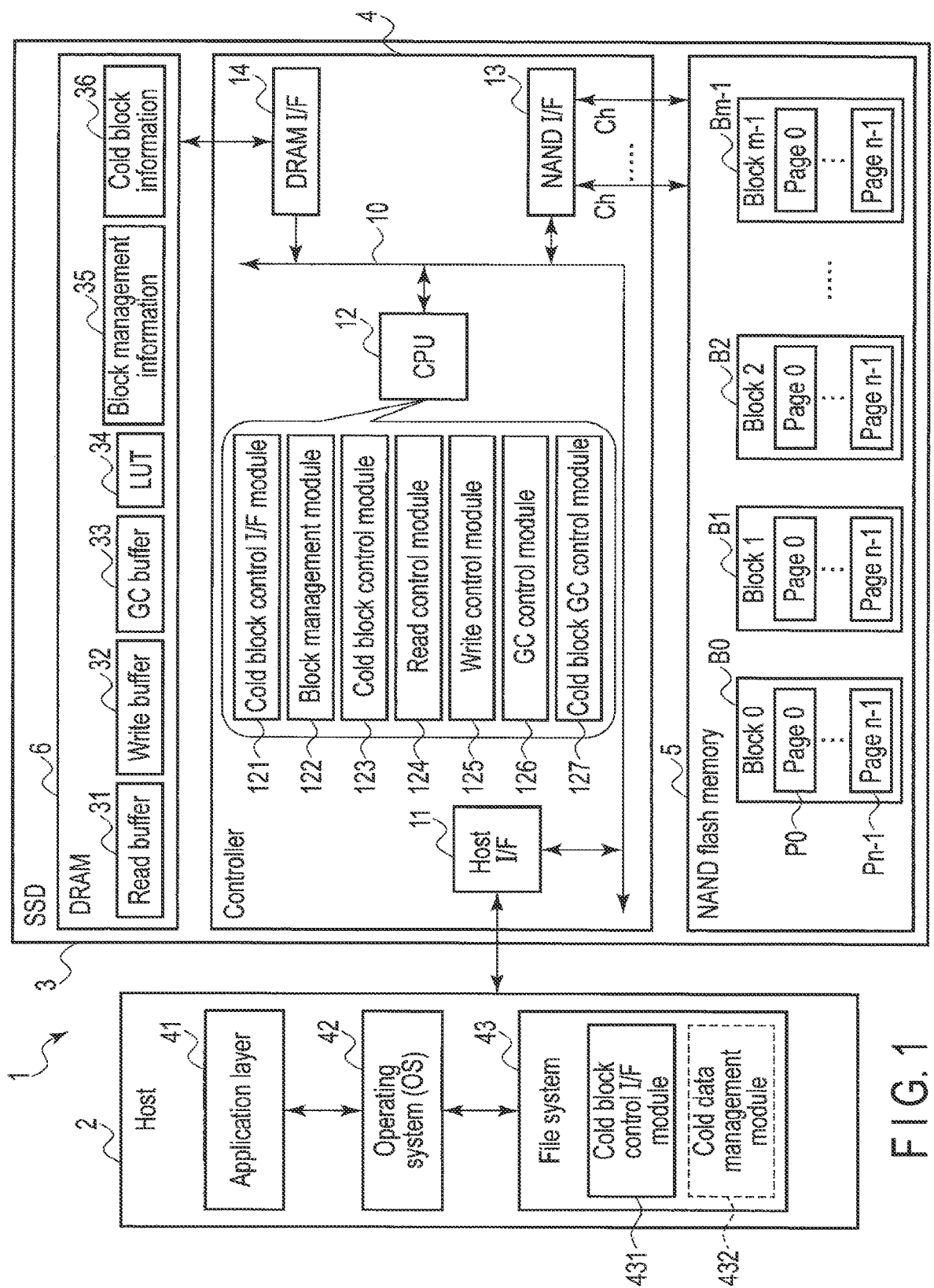
FIG. 1 is a block diagram illustrating a configuration example of a computer system according to a first embodiment.

A configuration of a computer system 1 according to a first embodiment is initially described with reference to FIG. 1.

The computer system 1 includes a host (host device) 2, and a semiconductor storage device configured to write data to a nonvolatile memory and read data from the nonvolatile memory.

The host 2 is an information processing device (computing device) which accesses the semiconductor storage device. The host 2 may be either a server (storage server) which stores a large amount and various types of data in the semiconductor storage device, or a personal computer. The semiconductor storage device is realized by, for example, a solid state drive (SSD) 3 including a NAND flash memory.

The SSD 3 may be used as a main storage of the information processing device functioning as the host 2. The SSD 3 may be built in the information processing device, or connected to the information processing device via a cable or a network. For example, the SSD 3 as a direct attached storage (DAS) is connected to the host 2.

As an interface which achieves mutual connection between the host 2 and the SSD 3, small computer system interface (SCSI), serial attached SCSI (SAS), advanced technology attachment (ATA), serial ATA (SATA), PCI Express (PCIe) (registered trademark), Ethernet (registered trademark), fibre channel, NVM Express (NVMe) (registered trademark), or other interfaces may be used.

The SSD 3 includes a controller 4 and a NAND flash memory 5. The controller 4 can be implemented by a circuit such as a system-on-a-chip (SoC). The SSD 3 may include a random access memory as a volatile memory, such as a dynamic random access memory (DRAM) 6. Alternatively, a random access memory such as static random access memory (SRAM) may be built in the controller 4.

For example, the random access memory such as the DRAM 6 includes a read buffer (RB) 31, a write buffer (WB) 32 and a GC buffer 33, and a cache area for a lookup table (LUT) 34. The read buffer (RB) 31 is a buffer area for temporarily storing data read from the NAND flash memory 5. The write buffer (WB) 32 and the GC buffer 33 are buffer areas for temporarily storing data written to the NAND flash memory 5. The lookup table (LUT) 34 functions as an address translation table (logical/physical address translation table). The random access memory such as the DRAM 6 may further include a storage area for storing various types of information (e.g., block management information 35 and cold block information 36) used during processing. Note that the DRAM 6 may be provided inside the controller 4. The LUT 34 manages mapping between respective logical addresses and respective physical addresses of the NAND flash memory 5.

The NAND flash memory 5 may include multiple NAND flash memory chips (multiple NAND flash memory dies). Each of the chips is implemented as a flash memory configured to be capable of storing multiple bits per memory cell.

The controller 4 is electrically connected to the NAND flash memory 5 as the nonvolatile memory via a NAND interface 13 such as toggle DDR and open NAND Flash Interface (ONFI). The NAND interface 13 functions as a NAND control circuit configured to control the NAND flash memory 5. The NAND interface 13 may be connected to each of the chips in the NAND flash memory 5 via multiple channels.

The controller 4 functions as a memory controller configured to control the NAND flash memory 5.

The controller 4 may function as a flash translation layer (FTL) configured to execute data management and block management of the NAND flash memory 5. The data management executed by the FTL includes (1) management of mapping information indicating a correspondence between respective logical addresses and respective physical addresses of the NAND flash memory 5, (2) processing for concealing read/write operations in units of page and erase operations in units of block, and others. The logical addresses are addresses used by the host 2 for addressing the SSD 3. For example, the logical addresses adopted herein are logical block addresses (LBAs).

Management of mapping between respective logical block addresses (LBAs) and respective physical addresses is achieved by using the lookup table (LUT) 34 which functions as an address translation table (logical/physical address translation table). The controller 4 manages mapping between respective LBAs and respective physical addresses in units of particular management size by using the LUT 34. A physical address corresponding to a certain LBA indicates a physical memory position to which data at this LBA is written in the NAND flash memory 5. The LUT 34 may be loaded from the NAND flash memory 5 to the DRAM 6 during power-on of the SSD 3.

Data writing to one page is allowed only once per one P/E cycle. Accordingly, the controller 4 writes updated data corresponding to a certain LBA not to a physical memory position where previous data corresponding to this LBA has been stored, but to a different physical memory position. Subsequently, the controller 4 updates the LUT 34 and associates the LBA with the different physical memory position, and thereby invalidate the previous data. Data which is referred to by the LUT 34 (i.e., data associated with a logical address) is hereinafter referred to as valid data. On the other hand, data which is not associated with any logical address is referred to as invalid data. The valid data is data likely to be read by the host 2 later. The invalid data is data unlikely to be read by the host 2 any longer.

The block management includes management of bad blocks, wear leveling, garbage collection (GC), and others.

As described above, the NAND flash memory 5 performs write/read of data in units of page, and erase of data in units of block. Erase of a block requires a long period of time. Each block in the NAND flash memory 5 has such a characteristic that overwriting of data at an identical physical memory position is not allowed until completion of erasing.

Accordingly, the SSD 3 operates in such a write system which additionally writes write data received from the host 2 to a new physical memory position in the NAND flash memory 5. When additional writing in this manner proceeds, data write destination blocks will be exhausted. For avoiding this problem, GC is performed to generate free blocks.

GC selects a GC source block from blocks to which data is written (active blocks), collects valid data from the GC source block, and writes the collected valid data to a new block (GC destination block) to turn (convert) the block where the valid data has been originally stored into a free block. The free block to which an erase process has been subjected is available as a new write destination block. A block containing a small number of pieces of valid data is often selected as a GC source block. Such a block is selected to increase generation efficiency of a free block.

The controller 4 may include a host interface 11, a central processing unit (CPU) 12, the NAND interface 13, a DRAM interface 14, and others. The respective units of the host interface 11, the CPU 12, the NAND interface 13, and the DRAM interface 14 may be mutually connected via a bus 10.

The host interface 11 functions as a circuit which receives various types of commands from the host 2, such as input/output (I/O) commands and various types of control commands. Examples of the I/O commands include a write command, a read command, an unmap command (trim command), a format command, a flush command, and other commands. The format command is used for unmapping the entire memory system (SSD 3). The flash command is used for writing, to the NAND flash memory 5, dirty data (user data and associated management data) cached (buffered) in the memory system to achieve an entirely clean state.

The DRAM interface 14 functions as a DRAM controller configured to control accesses of the DRAM 6. The memory area of the DRAM 6 is used for storing the read buffer (RB) 31, the write buffer (WB) 32, the GC buffer 33, the LUT 34, the block management information 35, the cold block information 36, and others.

The CPU 12 is a processor configured to control the host interface 11, the NAND interface 13, and the DRAM interface 14. The CPU 12 executes control programs (firmware) stored in a not-shown read only memory (ROM) or the like to perform various types of processes. The CPU 12 is capable of executing command processing which processes various commands received from the host 2, for example, as well as the processing by the FTL described above. The operation of the CPU 12 is controlled under the firmware executed by the CPU 12. Note that a part or the whole of the FTL processing and the command processing may be executed by dedicated hardware in the controller 4.

The computer system 1 has a function for collecting redundant capacity (over provisioning (OP)) in a cold block in the SSD 3. The cold block is a block where most of data in the block is constituted by cold data. The cold data is data in an infrequently accessed LBA range. The cold block basically contains a large amount of valid data, and also contains invalidated data. The invalidated data becomes OP in the cold block.

According to the present embodiment, the SSD 3 manages information about the cold data and the cold block, and notifies the host 2 of this information via an interface to realize a system for handling the cold data through cooperation between the SSD 3 and the host 2. In this manner, the SSD 3 is capable of collecting OP in the cold block in cooperation with the host 2.

Figure 2:
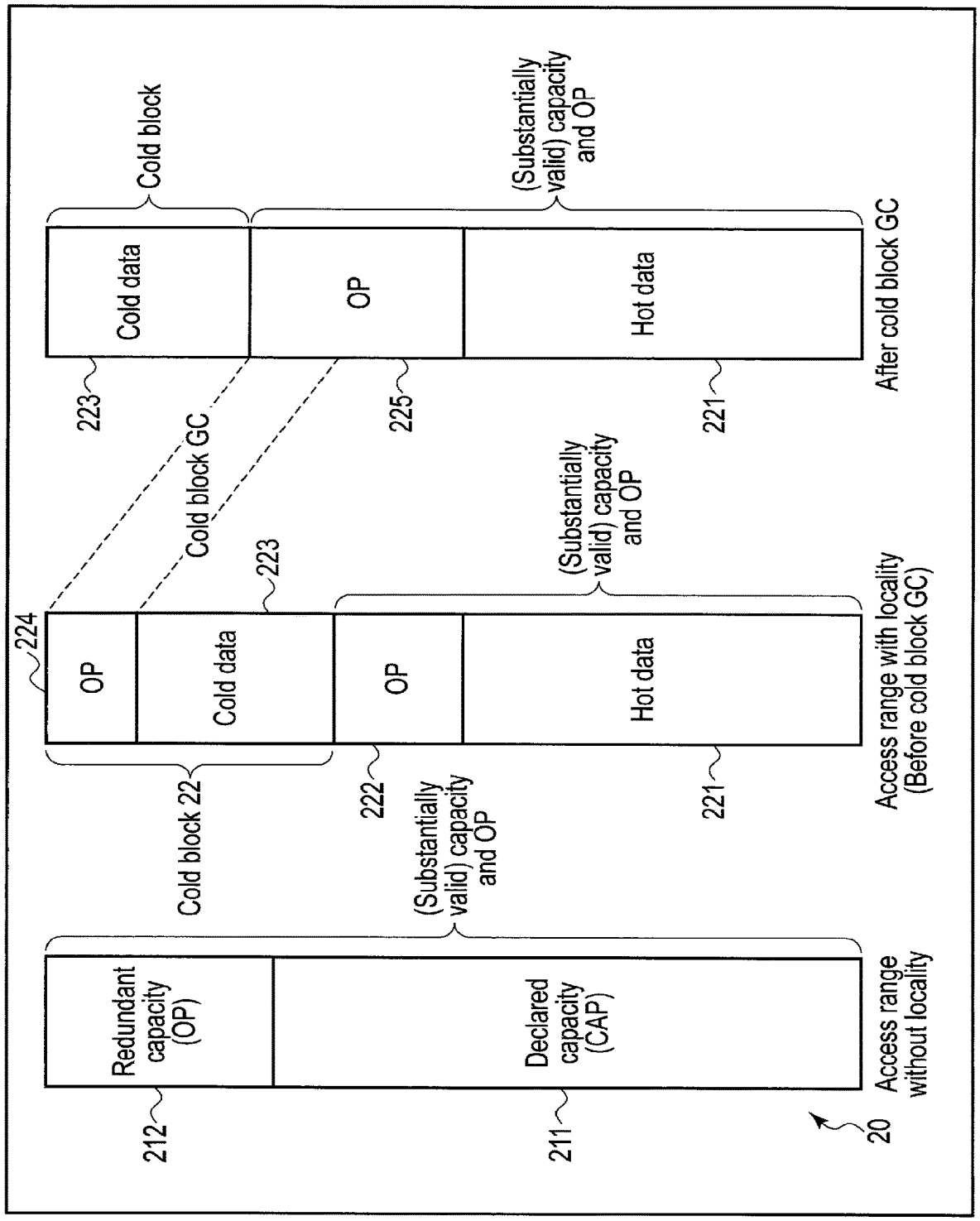
FIG. 2 is a diagram for explaining redundant capacity (OP) in a cold block collected by the computer system of the first embodiment.

OP in a cold block collected by the computer system 1 will be explained with reference to FIG. 2.

Whole physical size (assembly size) 20 of the NAND flash memory 5 is constituted by declared capacity (capacity: CAP) 211 and redundant capacity (over-provisioning: OP) 212. The redundant capacity 212 is a difference between the physical size 20 and the declared capacity 211. A ratio of the redundant capacity 212 to the declared capacity 211 is called a redundant ratio. Generally, an amount of valid data of the whole NAND flash memory 5 decreases as the redundant ratio increases. In this case, generation efficiency of free blocks by GC increases, and a write amplification factor (WAF) decreases. It is therefore important to secure sufficient OP.

There are following possible types of a workload by a user: a type having no access range locality; and a type having access range locality. For example, according to an access pattern of the workload having no access range locality, logical addresses of access targets included in accesses (commands) adjacent to each other in time series extend in a wide logical address space, and do not fall in a narrow logical address space. On the other hand, for example, according to an access pattern of the workload having access range locality, logical addresses of access targets included in accesses adjacent to each other in time series fall within a narrow logical address space.

In case of the user workload having no access range locality, each of the declared capacity 211 and the redundant capacity 212 becomes a substantially valid capacity.

However, in case of the user workload having access range locality, the cold block 22 may increase in the NAND flash memory 5. In addition, a memory area occupied by invalid data in the cold block 22, i.e., redundant capacity (OP) 224 may increase.

For example, the cold block 22 contains cold data 223 as valid data, and invalid data corresponding to the redundant capacity 224. Data contained in the SSD 3 and corresponding to an infrequently accessed logical address (e.g., data corresponding to logical address accessed with a frequency lower than a first threshold) is referred to as the cold data 223. In addition, a block constituted by data most of which is cold data is referred to as the cold block 22. For example, the cold block 22 is such a block which contains an amount of cold data exceeding a second threshold, or a block which contains cold data at a ratio exceeding a particular ratio to entire data in the block.

The cold block 22 is unavailable for new writing of data. Accordingly, a capacity which stores hot data 221 as valid data and the redundant capacity (OP) 222 other than the cold block 22 constitute substantially valid capacity. The hot data 221 is data contained in the SSD 3 and corresponding to a frequently accessed logical address (e.g., data accessed with frequency higher than or equal to a first threshold).

For example, execution of a GC operation that processes the cold block 22 as a GC source block is considered to collect the redundant capacity (OP) 224 in the cold block 22. This GC operation collects the redundant capacity 224 contained in the cold block 22. Accordingly, a redundant capacity 225 additionally including the collected redundant capacity 224, and the capacity 221 storing hot data are available as substantially valid capacity.

Figure 3A:
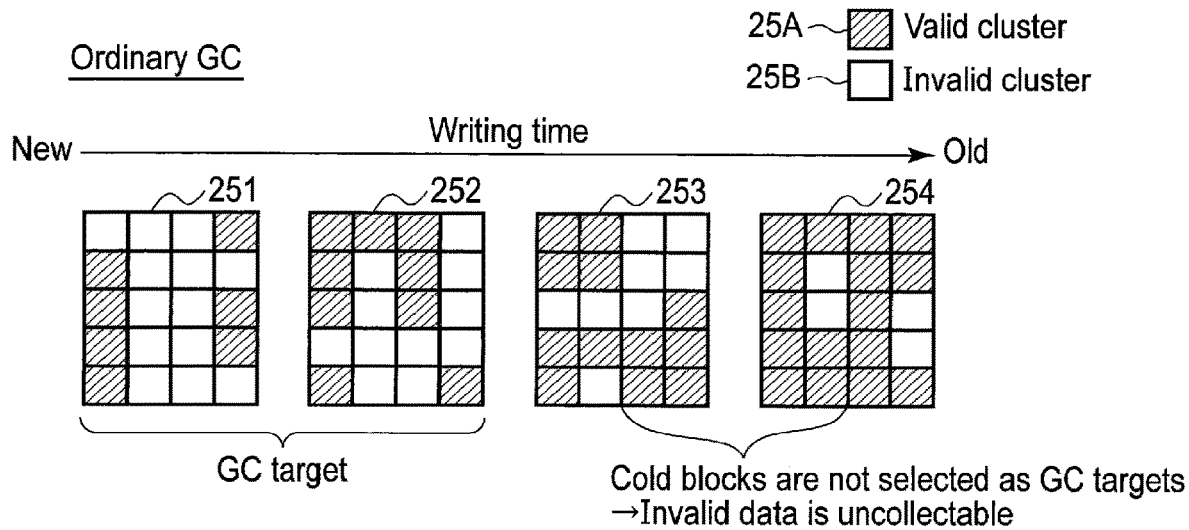
FIG. 3A is a diagram for explaining ordinary garbage collection (GC).
Figure 3B:
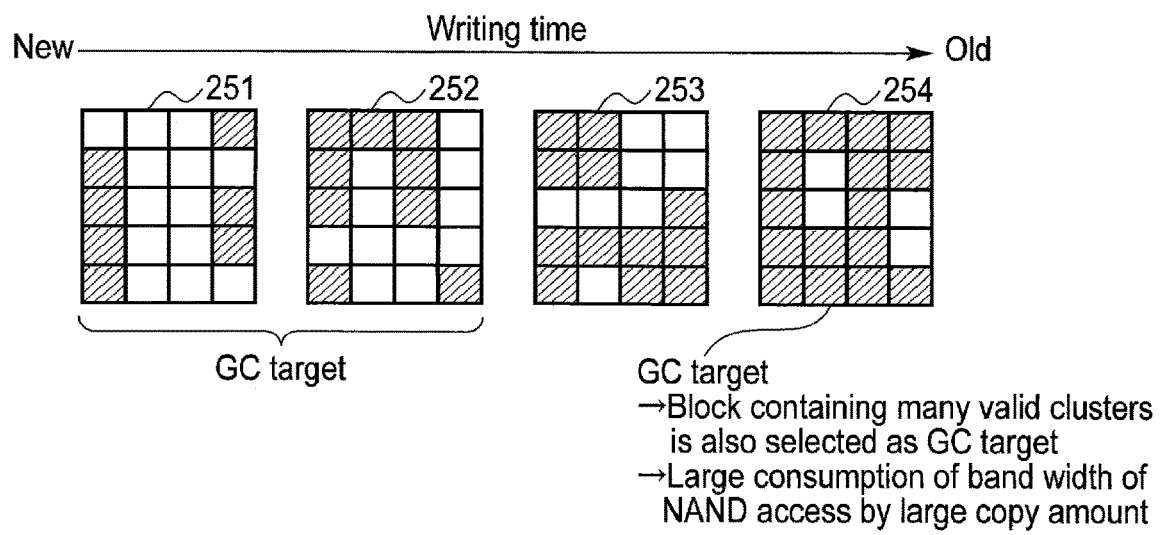
FIG. 3B is a diagram for explaining GC considering writing time.

With reference to FIGS. 3A and 3B, an ordinary GC operation, and a GC operation processing a cold block as a GC source block will be explained. An example described herein is a case where blocks 251, 252, 253, and 254 are present in this order from the newest writing. Each of the blocks is constituted valid clusters 25A constituted by valid data and/or invalid clusters 25B constituted by invalid data.

FIG. 3A shows GC source blocks in the ordinary GC operation. In the ordinary GC operation, the blocks 251 and 252 each containing a small amount of valid data are selected as GC source blocks. For example, the amount of valid data in each block can be defined by a number of valid clusters, a ratio of the number of valid clusters to a total number of clusters in the block, or bytes corresponding to the valid clusters.

In the ordinary GC operation, the blocks 253 and 254 containing a large amount of valid data remain unselected as GC source blocks. More specifically, the cold blocks 253 and 254 containing cold data infrequently accessed remain unselected as GC targets even when containing a small amount of invalid data (invalid clusters). Accordingly, capacities (OP) corresponding to invalid data contained in the blocks 253 and 254 are difficult to collect by the ordinary GC operation.

FIG. 3B shows GC source blocks in the GC operation considering writing time. According to the GC operation considering writing time, the block 254 corresponding to old writing (e.g., block containing valid data written before particular date and time) is selected as a GC source block in addition to the blocks 251 and 252 containing a small amount of valid data. In this case, the block 254 corresponding to old writing is selected as a GC source block even when the block 254 contains a large amount of valid data (valid clusters). Accordingly, the GC operation considering writing time can collect capacity (OP) of invalid data contained in the cold block 254 which corresponds to old writing and contains a large amount of valid data.

However, in case of the GC operation which processes the cold block 254 containing a large amount of valid data as a GC source block, a large amount of valid data in the cold block 254 is copied (moved) to a GC destination block. Such copying consumes a large quantity of a band width for accessing the NAND flash memory 5.

The band width for accessing the NAND flash memory 5 will be described with reference to FIGS. 4A and 4B. The NAND flash memory 5 includes memory chips MC0 to MC3. The controller 4 accesses each of the memory chips MC0 to MC3 via channels. A band width for accessing the respective memory chips MC0 to MC3 is limited. When all the limited band width is occupied, the memory chips MC0 to MC3 are difficult to access. Accordingly, latency may occur during waiting for access to the memory chips MC0 to MC3 until the band width is unoccupied.

Figure 4A:
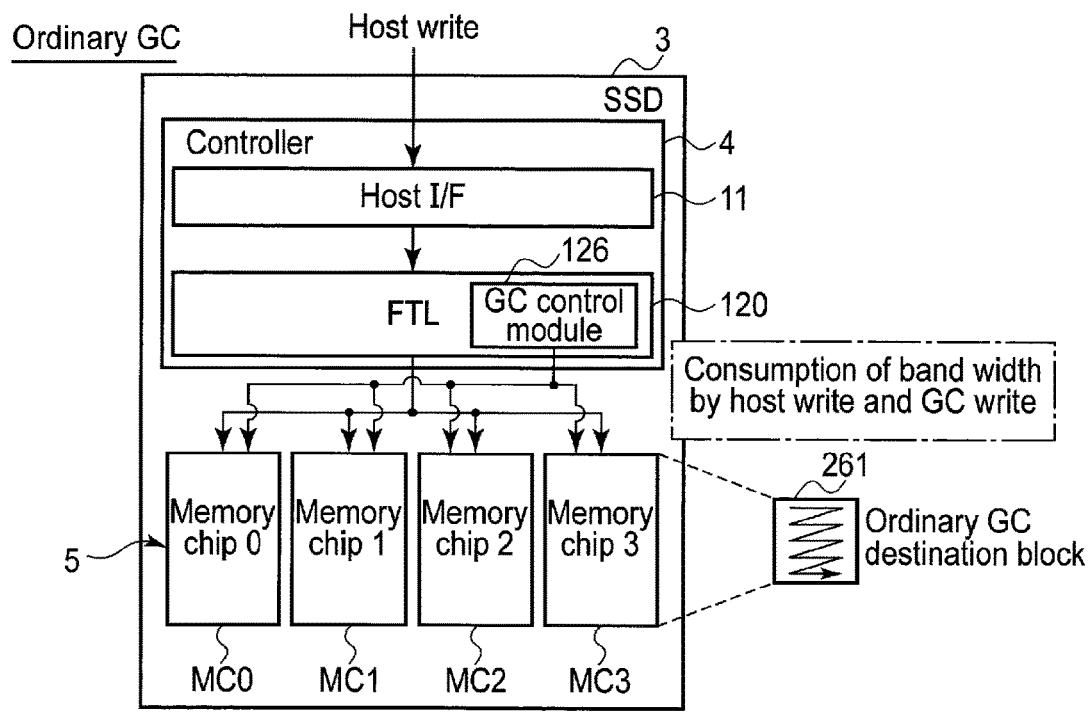
FIG. 4A is a diagram for explaining a band width of NAND access consumed by execution of ordinary GC.

FIG. 4A shows a case where an operation for a write command issued from the host 2 (host write operation), and an ordinary GC operation are performed. In the host write operation, user data received with a write command is written to the memory chips MC0 to MC3 via the host I/F 11 and an FTL 120. Writing of the user data consumes the band width for accessing the memory chips MC0 to MC3. In addition, data is moved from a GC source block to a GC destination block 261 in accordance with the ordinary GC operation performed by a GC control module 126 in the FTL 120. Moving the data also consumes the band width for accessing the memory chips MC0 to MC3. Accordingly, the band width for accessing the memory chips MC0 to MC3 is consumed by the host write operation and the ordinary GC operation in the example illustrated in FIG. 4A.

Figure 4B:
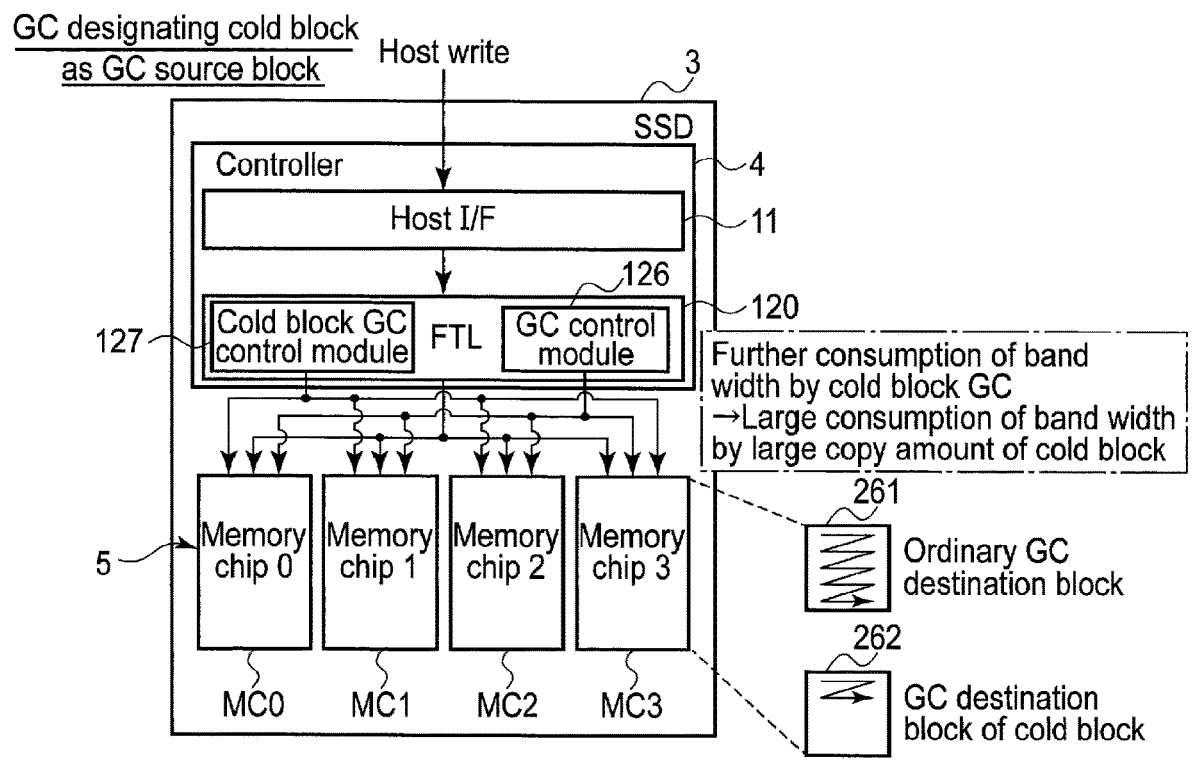
FIG. 4B is a diagram for explaining a band width of NAND access consumed by additional execution of GC which processes a cold block as a GC source block.

FIG. 4B referred to next shows a case where a cold block GC operation processing a cold block as a GC source block is further performed as well as the host write operation and the ordinary GC operation. In this case, data is moved from a GC source block as a cold block to a GC destination block 262 of the cold block in accordance with the cold block GC operation performed by a cold block GC control module 127 in the FTL 120. Moving the data from the cold block to the GC destination block 262 further consumes the band width for accessing the memory chips MC0 to MC3. Accordingly, the band width for access to the memory chips MC0 to MC3 is consumed by the host write operation, the ordinary GC operation, and the cold block GC operation in the example illustrated in FIG. 4B.

The cold block stores a large amount of valid data. A large quantity of the band width for accessing the memory chips MC0 to MC3 is therefore consumed to copy the valid data to the GC destination block 262. When the band width for accessing the memory chips MC0 to MC3 is occupied by the cold block GC operation in the SSD 3 at the time of issuance of an access request from the host 2 to the SSD 3, the host 2 interprets this condition as occurrence of latency for accessing. A variation of latency is an important element for evaluating quality of the SSD 3, and therefore is difficult to permit even when the operation for collecting OP in the cold block produces the variation.

Further considered may be such a GC operation which collects OP in a cold block at a speed not affecting the band width for accessing the NAND flash memory 5, i.e., while taking a considerable length of time, for example. However, it is undesirable to take a considerable length of time for the GC operation in view of possible elongation of a time required for completion of OP collection in the cold block.

Further considered may be such a determination that OP in a cold block is left without collection. However, a large amount of cold blocks may be generated in case of an access pattern having locality. In this case, it is undesirable to leave OP in the large amount of cold blocks without collection even when each cold block contains only a small amount of OP.

Accordingly, a new function capable of collecting OP in a cold block while reducing effect on accessing from the host 2 needs to be realized. According to the present embodiment, the host 2 and the SSD 3 operate in cooperation with each other to achieve this function.

A configuration associated with this function is hereinafter described more specifically.

Returning to FIG. 1, the CPU 12 in the controller 4 included in the SSD 3 is capable of functioning as a cold block control interface (I/F) module 121, a block management module 122, a cold block control module 123, a read control module 124, a write control module 125, a GC control module 126, and a cold block GC control module 127.

The cold block control I/F module 121 has an interface function for communicating with the host 2 to control a cold block in the SSD 3.

The block management module 122 manages, for each block in the SSD 3, block management information 35.

The block management information includes the number of times of erase (number of program/erase cycles), an erase sequence number, a number of pieces of valid data (valid data amount), and other information. For example, the block management module 122 monitors write operation, trim (unmap) operation, erase operation, and other operations for each block, and updates the block management information 35 every time these operations are performed.

The cold block control module 123 selects a cold block from blocks B0 to Bm-1 in the NAND flash memory 5 based on the block management information 35. The cold block control module 123 generates cold block information 36 concerning the selected cold block in response to, for example, an inquiry issued from the host 2. The cold block information 36 includes an OP amount collectable from the cold block, a processing time or a processing amount for turning the cold block into a block (free block) to which data is writable, and other information.

The read control module 124 calculates a physical address corresponding to a logical address (LBA) designated in a read command based on an entry of the LUT 34 corresponding to the LBA, and reads data in accordance with the read command from the NAND flash memory 5.

The write control module 125 stores, in the write buffer 32 of the DRAM 6, user data received with a write command from the host 2. The write control module 125 previously secures an area of the write buffer 32 for storing the user data. The write control module 125 does not receive a write command from the host 2 while a sufficient area in the write buffer 32 cannot be secured.

When user data for a unit of writing of the NAND flash memory 5 is stored in the write buffer 32, the write control module 125 transfers the user data in a unit of writing to a chip (data latch of chip) of the NAND flash memory 5. The write control module 125 frees the area where the transferred user data has been stored in the write buffer 32.

Thereafter, the write control module 125 instructs the chip of the NAND flash memory 5 to program. More specifically, the write control module 125 issues a program command to the chip of the NAND flash memory 5 to cause the chip to program the transferred user data in a write destination block. A memory cell array in the chip includes blocks. Each block is generally classified into an active block and a free block. The active block stores valid data and new data is not writable to the active block. The free block does not store valid data and is available for writing new data after subjecting the erase process. One block is selected from one or more free blocks, and subjected to the erase process to be allocated as a write destination block. The write destination block can store valid data.

The GC control module 126 is also capable of performing writing to the NAND flash memory 5 by using the GC buffer 33 in a manner similar to the write operation by the write control module 125 described above. The GC control module 126 selects a GC source block from active blocks storing valid data, and writes valid data included in the selected GC source block to a GC destination block secured as a write destination block from free blocks.

The cold block GC control module 127 is also capable of performing writing to the NAND flash memory 5 similarly to the GC control module 126. The cold block GC control module 127 writes valid data included in a cold block designated as a GC source block to a GC destination block secured as a write destination block from the free blocks. The GC control module 127 may perform the GC operation by using a buffer different from the GC buffer 33.

A configuration of the host 2 will be described. The host 2 has a function for accessing the SSD 3 connected as a DAS. The host 2 may further have a function for accessing a storage device on a network (cloud).

The host 2 is an information processing apparatus that executes various types of programs. The programs executed by the information processing apparatus include an application layer 41, an operating system (OS) 42, a file system 43, and others.

As generally known, the operating system (OS) 42 is software configured to manage the whole of the host 2, control hardware in the host 2, and perform controls for allowing applications to use the hardware and the SSD 3.

The file system 43 is used to control file operations (e.g., generation, storage, update, and deletion). For example, ZFS, Btrfs, XFS, ext4, or NTFS may be used as the file system 43. Alternatively, a file object system (e.g., Ceph Object Storage Daemon), or Key Value Store System (e.g., Rocks DB) may be used as the file system 43.

Various types of application software threads run on the application layer 41. Examples of application software threads include client software, database software, and virtual machine.

When issue of a request such as a read command or a write command is necessary from the application layer 41 to the SSD 3, the application layer 41 transmits the request to the OS 42. The OS 42 transmits the request to the file system 43. The file system 43 translates the request into a command (e.g., read command or write command). The file system 43 transmits the command to the SSD 3. When a response from the SSD 3 is received, the file system 43 transmits the response to the OS 42. The OS 42 transmits the response to the application layer 41.

The file system 43 includes a cold block control I/F module 431. The cold block control I/F module 431 has an interface function for communicating with the SSD 3 to control a cold block in the SSD 3. For example, the cold block control I/F module 431 inquires of the SSD 3 about information concerning a cold block. The cold block control I/F module 431 further requests the SSD 3 to collect OP in a cold block based on the information about the cold block when the current time is a time for collecting the OP in the cold block.

The file system 43 may further include a cold data management module 432. The cold data management module 432 manages which SSD data in a certain LBA range is stored in.

Figure 5:
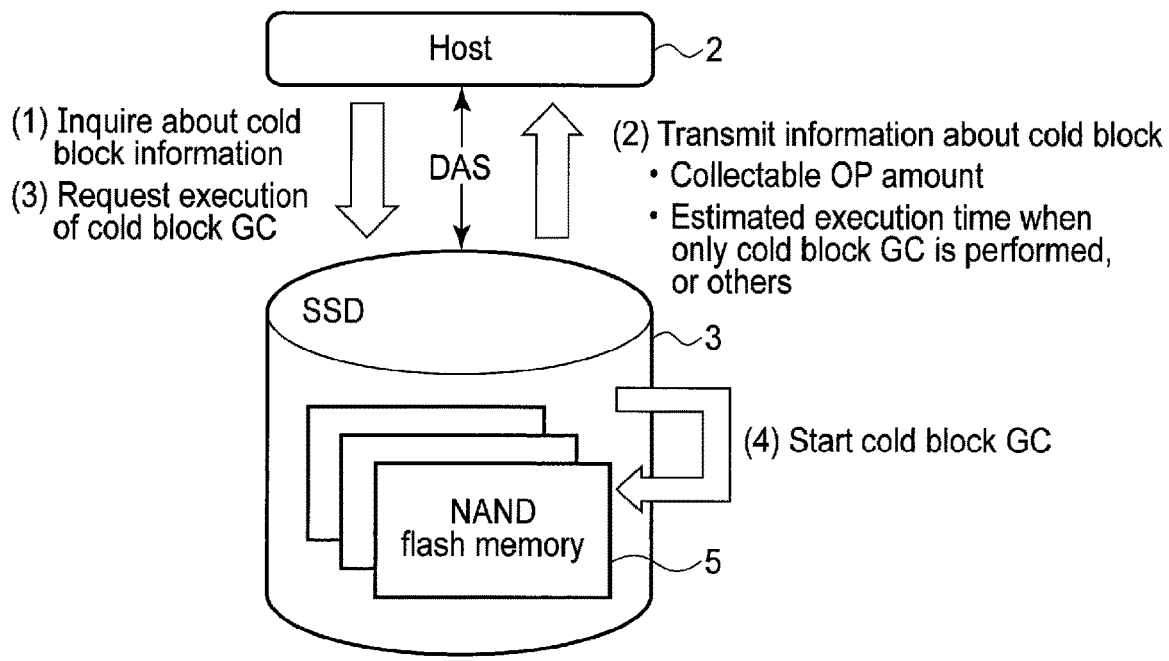
FIG. 5 is a diagram for explaining an example of an operation for collecting OP in a cold block in the computer system of the first embodiment.

FIG. 5 shows an example of an operation for collecting OP in a cold block in the computer system 1. In this example, the SSD 3 as a DAS is connected to the host 2 with one-to-one correspondence.

Initially, the host 2 inquires of the SSD 3 about the cold block information 36. The SSD 3 transmits the cold block information 36 to the host 2 in response to the inquiry. The cold block information 36 includes information about one or more cold blocks in the NAND flash memory 5 of the SSD 3. More specifically, the cold block information 36 includes an OP amount collectable from the cold blocks, a processing time or a processing amount estimated when only an operation for collecting OP from the cold blocks (cold block GC operation) is performed, and others.

The host 2 determines whether to request the SSD 3 to execute cold block GC by using the cold block information

36. The host 2 requests the SSD 3 to execute cold block GC when access from the host 2 to the SSD 3 is less affected by execution of cold block GC, such as a case where the host 2 is in an idling state. The SSD 3 starts execution of cold block GC for the NAND flash memory 5 in response to the request from the host 2.

Figure 6:
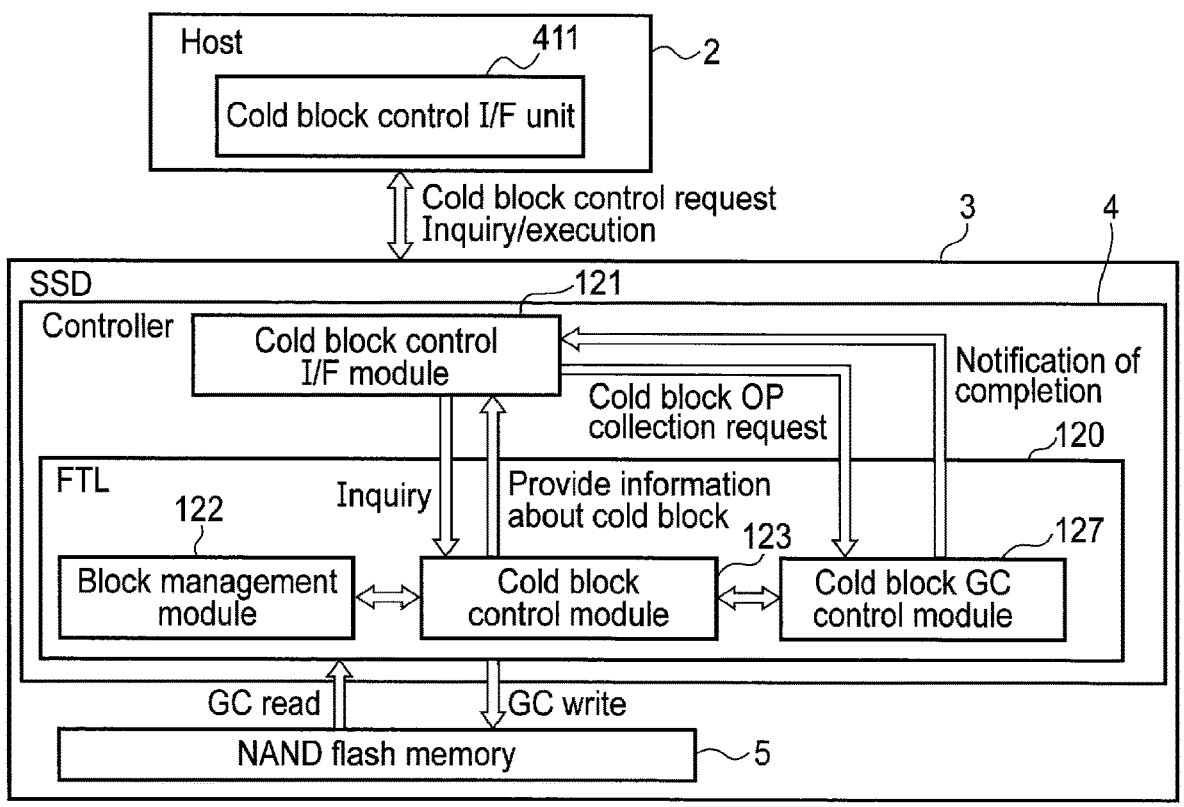
FIG. 6 is a block diagram illustrating an example of a configuration for collecting OP in a cold block in the computer system of the first embodiment.

FIG. 6 illustrates a configuration provided in the computer system 1 for collecting OP in one or more cold blocks. The host 2 includes the cold block control I/F module 431. The SSD 3 includes the cold block control I/F module 121, and includes, in the FTL 120, the block management module 122, the cold block control module 123 and the cold block GC control module 127. The procedure performed by the respective modules for collecting OP in the one or more cold blocks is described thereinafter.

(1) The block management module 122 of the SSD 3 manages, for each block in the SSD 3, the block management information 35 which includes the number of times of erase (the number of program/erase cycles), an erasing sequence number, the number of pieces of valid data (valid data amount), and other information.

FIG. 7 illustrates a configuration example of the block management information 35 generated and updated by the block management module 122. The block management information 35 includes records corresponding to the blocks B0 to Bm-1 in the NAND flash memory 5. For example, each record includes the block number, the number of times of erasing, the erasing sequence number, and the valid data amount.

The "block number" in a record corresponding to a certain block indicates a block number allocated to the block. Note that any information for identifying a block may be employed in place of a block number.

The "number of times of erasing" indicates the number of times of erasing of a corresponding block (e.g., the number of times of execution of erase process up to current time). Accordingly, the number of times of erasing corresponding to the block increases by one in response to execution of the erase process for the block.

The "erasing sequence number" is a number counted up from a certain time (e.g., use start time of SSD 3) every time the erase process is performed for any block in the NAND flash memory 5, and is set as an "erasing sequence number" of a record corresponding to the block subjected to the erase process.

The "valid data amount" indicates an amount of valid data contained in a corresponding block. The valid data amount of each block may be specified by the number of clusters, percentage, or in units such as bytes.

(2) The cold block control module 123 of the SSD 3 selects one or more cold blocks from the blocks B0 to Bm-1 in the NAND flash memory 5 based on the block management information 35, and generates a list of cold blocks. For example, the generated list contains one or more block numbers corresponding to the one or more blocks selected as cold blocks. For example, a cold block is a block corresponding to old rewriting. For example, the cold block control module 123 determines, as a cold block, a block rewritten at a date and time before a particular date and time.

Note that the cold block control module 123 may determine whether a certain block is a cold block based on the erasing sequence number for each block. As described above, the erasing sequence number is a number counted up from a certain time (e.g., use start time of SSD 3) every time the erase process is performed for any block in the NAND flash memory 5. The erasing sequence number is associated with the erased block. The cold block control module 123 may determine that a block of which the erasing sequence number is smaller than a particular number is a cold block. The cold block control module 123 may further determine that a target block is a cold block when a difference between a latest erasing sequence number (maximum value of erasing sequence number) and an erasing sequence number of the target block exceeds a third threshold by comparison between these numbers.

Alternatively, the cold block control module 123 may determine a block erased a number of times smaller than a fourth threshold is a cold block. When a block erased a smaller number of times remains unselected as a GC source block, the block is regarded as a cold block containing a large amount of cold data infrequently accessed.

(3) The cold block control I/F module 431 of the host 2 inquires of the SSD 3 about the cold block information 36.

(4) The cold block control module 123 of the SSD 3 receives the inquiry issued from the host 2 about the cold block information 36 via the cold block control I/F module 121. The cold block control module 123 generates the cold block information 36 in response to the inquiry based on the generated list of cold blocks. For example, the cold block information 36 contains a processing time or a processing amount from a start to completion of a process performed by the SSD 3 for collecting OP in a cold block, and an OP amount available by completion of the process (i.e., collected OP amount in a cold block), as estimated from a valid data amount in the cold block when only the process for collecting OP is executed (such as case where new I/O command is not issued from host 2). The cold block control module 123 transmits the cold block information 36 to the host 2 via the cold block control I/F module 121.

FIG. 8 illustrates a configuration example of the cold block information 36 generated by the cold block control module 123. The cold block information 36 contains one or more records corresponding to one more blocks determined as cold blocks. For example, each record contains the block number, a processing time (or processing amount), and an OP collection amount.

The "block number" in a record corresponding to a certain cold block indicates the block number allocated to the block. The "processing time" indicates an estimated processing time (or processing amount) required for a GC operation designating the block as a GC source block. The "OP collection amount" indicates a storage capacity collected by the GC operation.

Note that the cold block information 36 which contains records each setting only a value of "block number" may be adopted as a list of cold blocks for the procedure (2).

(5) The cold block control I/F module 431 of the host 2 receives the cold block information 36 from the SSD 3, and determines whether the current time is a time for collecting OP in the one or more cold blocks based on the cold block information 36. The cold block control I/F module 431 determines whether the current time is a time for collecting OP in the cold blocks based on an estimated processing amount required for a GC operation which designates each cold block as a GC source block, an access frequency to the SSD 3, a period of time in which each resource of the host 2 is in a busy state, and an amount of processing under execution by a processor of the host 2.

More specifically, the cold block control I/F module 431 determines the current time is a time for collecting OP in the cold blocks when the access frequency to the SSD 3 is low based on indexes such as the number of processes simultaneously operating on the host 2, and a period of time in which respective types of resources are in busy states. The cold block control I/F module 431 determines that the current time is a time for collecting OP in the cold blocks when the number of processes is smaller than a fourth threshold, or when the period of time in which the resources are in busy states is shorter than a fifth threshold, for example. Each of the fourth threshold and the fifth threshold may be set to a smaller value as the processing time required for performing only the process for collecting OP in the cold blocks by the SSD 3 becomes longer, based on the cold block information 36, for example. In addition, the fourth threshold or the fifth threshold may be set to a larger value as the available OP amount obtained after completion of the process for collecting OP in the cold blocks by the SSD 3 becomes larger, based on the cold block information 36.

(6) The cold block control I/F module 431 issues a request for collecting OP in the cold blocks to the SSD 3 when the current time is determined to be a time for collecting OP in the cold blocks.

Examples of the method for implementing this request include a method utilizing device self-test in conformity with NVMe standard. Commands of the device self-test are classified into NVMe Admin commands, and mainly used for a test of a device itself. Processing for the device self-test is required to be executed in the background. Accordingly, when a different command needs to be processed, the controller 4 of the SSD 3 temporarily aborts the processing of the device self-test, and processes the different command. After completion of the processing of the different command, the controller 4 restarts the processing of the device self-test.

FIG. 9 illustrates a format of commands used for the device self-test. As illustrated in FIG. 9, a self test code (STC) for specifying an action caused by a command is set in a field corresponding to [03:00] bits in the command. An associated self-test operation is started in response to a command for which "1h" or "2h" is set in the field. In addition, the device self-test under execution is aborted in response to a command for which "Fh" is set in the field.

(7) The cold block GC control module 127 of the SSD 3 performs an operation for collecting OP in the cold block when a request for collecting OP in the cold block is received from the host 2. More specifically, the SSD 3 performs an operation for collecting OP in the cold blocks in addition to ordinary operations (e.g., host write and GC).

For example, the cold block GC control module 127 collects OP in the cold blocks by performing a GC operation which designates each cold block shown in the list generated in the procedure (2) as a GC source block. More specifically, the cold block GC control module 127 reads valid data (cold data) in the cold block that is selected as the GC source block (GC read), and stores the read valid data in the GC buffer 33. When a sufficient amount of data for a unit of writing (page) is stored in the GC buffer 33, the data is written to a GC destination block for cold blocks (GC write).

(8) When OP in all the cold blocks shown in the list is collected (i.e., when GC process designating all cold blocks as GC source blocks is completed), the cold block GC control module 127 notifies the host 2 of completion of the GC process.

Note that the cold block control I/F module 431 of the host 2 may issue, to the SSD 3, a request for aborting the process for collecting OP in the cold blocks in the procedure (7) described above in accordance with the number of processes or the situations of the resources on the host 2. For example, in case of adoption of commands of the device self-test of NVMe, the cold block control I/F module 431 issues a command which indicates a value for requesting abort of the device self-test to request the SSD 3 to abort the process for collecting OP in the cold blocks.

The cold block GC control module 127 of the SSD 3 aborts the operation for collecting OP in the cold blocks in response to the request of this command. As a result, the SSD 3 shifts to ordinary operations (e.g., host write and GC). Subsequently, the cold block control module 123 updates the list of cold blocks generated in the procedure (2) in response to the abort. When the operation for collecting OP in the cold blocks is intended to be restarted, the operation starts with the procedure (3) where the cold block control I/F module 431 of the host 2 inquires of the SSD 3 about the cold block information 36, for example.

In addition, the block as a target of OP collection may be a block including data that should be moved for data retention (reliability). In this case, such a block which includes data highly likely to cause retention errors is specified based on the number of error bits in error correction during read of a patrol executed as a data retention management, for example. OP in the specified block can be collected by performing the foregoing operation for the specified block instead of the cold block.

A flowchart in FIG. 10 shows an example of the procedure of a cold block management process executed by the controller 4 of the SSD 3.

The controller 4 generates (updates) the block management information 35 (step S11). The block management information 35 contains a record for each block as illustrated in FIG. 7. The controller 4 updates the block management information 35 when the erase operation is performed or when a valid data amount of each block is changed in accordance with an operation corresponding to a command received from the host 2, or a garbage collection operation.

Subsequently, the controller 4 determines whether the current time is a time for listing cold blocks (step S12). The controller 4 determines that the current time is a time for listing cold blocks, for example, at regular time intervals.

When the current time is a time for listing cold blocks (YES in step S12), the controller 4 generates (updates) a list of cold blocks (step S13). The controller 4 generates (updates) the list of cold blocks by detecting blocks estimated as cold blocks based on the block management information 35.

When the current time is not a time for listing cold blocks (NO in step S12), step S13 is skipped.

The controller 4 then determines whether an inquiry about the cold block information 36 has been received from the host 2 (step S14). When an inquiry about the cold block information 36 has not been received (NO in step S14), the process returns to step S11 to continue update of the block management information 35.

On the other hand, when an inquiry about the cold block information 36 has been received (YES in step S14), the controller 4 generates the cold block information 36 based on the block management information 35 and the list of cold blocks (step S15). The controller 4 transmits the generated cold block information 36 to the host 2 (step S16).

Figure 11:
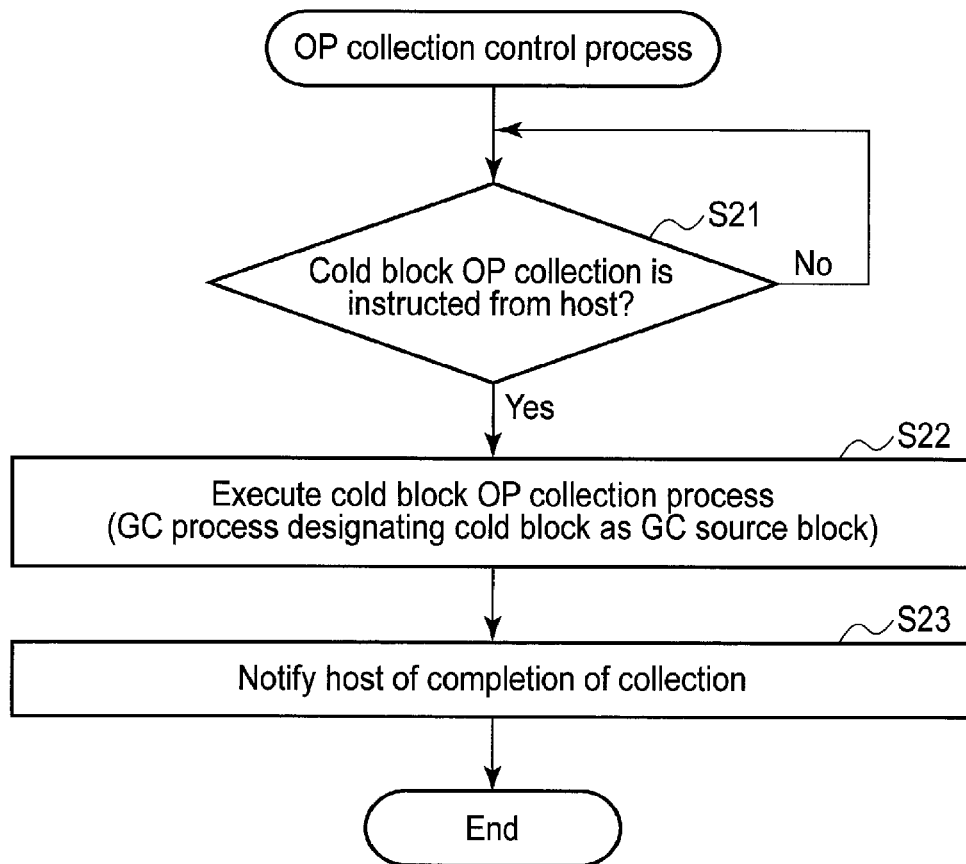
FIG. 11 is a flowchart showing an example of the procedure of an OP collection control process executed by the SSD in FIG. 10.

A flowchart in FIG. 11 shows an example of the procedure of an OP collection control process executed by the controller 4 of the SSD 3.

The controller 4 determines whether collection of OP in one or more cold blocks has been instructed by the host 2 (step S21). When it is determined that collection of OP in the cold blocks has not been instructed (NO in step S21), the process returns to step S21.

When it is determined that collection of OP in the cold blocks has been instructed (YES in step S21), the controller 4 executes an OP collection process for the cold blocks, i.e., a GC process which designates each cold block as a GC source block (step S22).

When the OP collection process for the cold blocks is completed, the controller 4 notifies the host 2 of completion of collection (step S23).

A subsequent flowchart in FIG. 12 shows an example of the procedure of a cold block control process executed by the host 2.

The host 2 determines whether the current time is a time for inquiring of the SSD 3 about the cold block information 36 (step S31). For example, the host 2 determines that the current time is a time for inquiry about the cold block information 36 at regular time intervals. When the current time is not a time for inquiry about the cold block information 36 (NO in step S31), the process returns to step S31.

When the current time is a time for inquiry about the cold block information 36 (YES in step S31), the host 2 inquires of the SSD 3 about the cold block information 36 (step S32). Subsequently, the host 2 receives the cold block information 36 transmitted from the SSD 3 in response to the inquiry (step S33).

The host 2 then determines whether the current time is a time for issuing a request for OP collection in the cold block (step S34). For example, as a time for issuing a request for collecting OP in the cold block, the host 2 detects an infrequently accessing time to the SSD 3 based on an index such as the small number of processes simultaneously operating on the host 2. When the current time is not determined to be a time for issuing a request for collecting OP in the cold block (NO in step S34), the process returns to step S31.

On the other hand, when the current time is determined to be a time for issuing a request for collecting OP in the cold block (YES in step S34), the controller 4 issues, to the SSD 3, a request for collecting OP in the cold block (step S35).

Subsequently, the host 2 determines whether a notification of completion of OP collection has been received from the SSD 3 (step S36). When it is determined that a notification of completion has not been received (NO in step S36), the process returns to step S36. On the other hand, when it is determined that a notification of completion has been received (YES in step S36), the process ends.

As described above, the host 2 instructs, at a time when access from the host 2 is less affected, the SSD 3 to collect OP in the cold block based on the cold block information 36 received from the SSD 3. Accordingly, the SSD 3 is capable of collecting OP in the cold block while reducing effect on access from the host 2.

Second Embodiment

According to the first embodiment, the SSD 3 transmits, to the host 2, the cold block information 36 including a processing time or a processing amount required for collecting OP in a cold block, an OP amount collectable from the cold block, and other information, in response to an inquiry from the host 2. In a second embodiment, an SSD 3 notifies a host 2 of information indicating a necessity for collecting OP in a cold block when particular conditions are met, regardless of presence or absence of an inquiry from the host 2.

A configuration of a computer system 1 according to the second embodiment is similar to the configuration of the computer system 1 of the first embodiment. The second embodiment is different from the first embodiment only in the point of the procedure of processing executed by a cold block control module 123 of the SSD 3. Only the different point from the first embodiment is hereinafter described.

The cold block control module 123 selects one or more cold blocks from blocks B0 to Bm-1 in a NAND flash memory 5 based on block management information 35, and generates a list of cold blocks. The cold block control module 123 generates cold block information 36 based on the list of cold blocks. As described above with reference to FIG. 8, the cold block information 36 includes, for example, a processing time or a processing amount from a start to completion of a collection process for collecting OP from a cold block, as estimated from a valid data amount in the cold block when only the collection process is executed (such as case where new I/O command is not issued from host 2). The cold block information 36 further includes an OP amount available by completion of the process (i.e., collected OP amount in a cold block) that is estimated from the valid data amount in the cold block.

The cold block control module 123 determines whether OP in one or more cold blocks needs to be collected based on the cold block information 36. For example, the cold block control module 123 determines that OP in the cold blocks needs to be collected when an OP amount in the cold blocks exceeds a sixth threshold. When it is determined that OP in the cold blocks needs to be collected, the cold block control module 123 notifies the host 2 of information indicating the necessity of collecting OP in the cold blocks (i.e., information indicating necessity of turning the cold blocks into one or more blocks to which data is writable). The cold block control module 123 may further notify the host 2 of a state that the OP amount (invalid data amount) in the cold blocks has exceeded the sixth threshold. In addition, the cold block control module 123 may transmit the cold block information 36 to the host 2 together with the notification.

A cold block control I/F module 431 of the host 2 determines whether the current time is a time for collecting OP in the cold blocks based on the notification. The cold block control I/F module 431 determines the current time is a time for collecting OP in the cold blocks when the access frequency to the SSD 3 is low based on indexes such as the number of processes simultaneously operating on the host 2, and a period of time in which respective types of resources are in busy states. Subsequently, the cold block control I/F module 431 issues a request for collecting OP in the cold blocks to the SSD 3 when the current time is determined to be a time for collecting OP in the cold blocks.

The process for collecting OP in the cold blocks is similar to the corresponding process described in the first embodiment.

The SSD 3 thus configured is therefore capable of determining whether OP in the cold blocks needs to be collected. The host 2 is capable of determining whether the current time is a time for collecting OP in the cold blocks in accordance with processes and resource situations on the host 2 based on a notification received from the SSD 3 about information indicating the necessity of collecting OP in the cold blocks, without a need for inquiring of the SSD 3 about the cold blocks.

Figure 13:
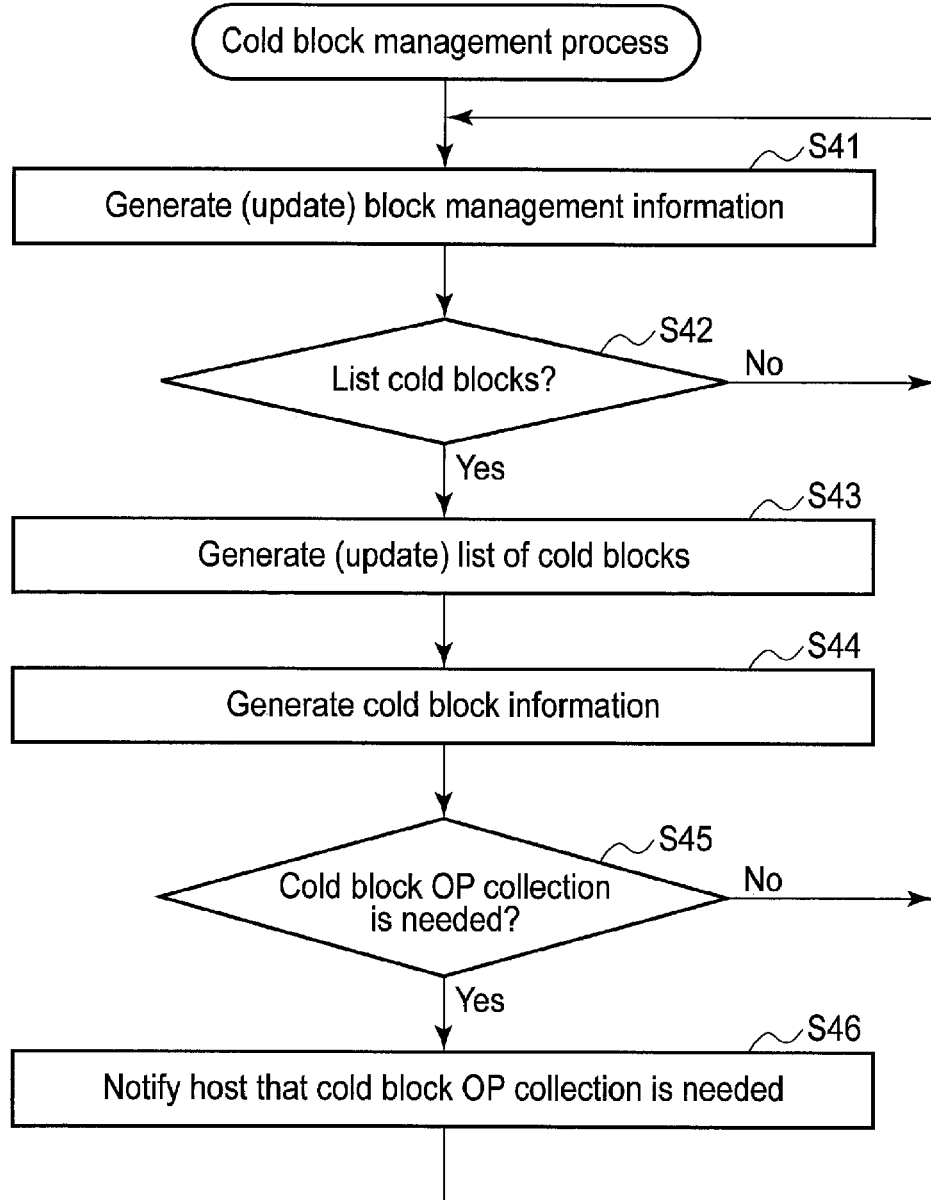
FIG. 13 is a flowchart showing an example of the procedure of a cold block management process executed by an SSD included in a computer system according to a second embodiment.

A flowchart in FIG. 13 shows an example of the procedure of a cold block management process executed by a controller 4 of the SSD 3.

Initially, the controller 4 generates (updates) the block management information 35 (step S41). The controller 4 then determines whether the current time is a time for listing cold blocks (step S42). For example, the controller 4 determines that the current time is a time for listing cold blocks at regular time intervals.

When the current time is not a time for listing cold blocks (NO in step S42), the process returns to step S41 to continue update of the block management information 35.

On the other hand, when the current time is a time for listing cold blocks (YES in step S42), the controller 4 generates (updates) a list of cold blocks (step S13). The controller 4 generates (updates) the list of cold blocks by detecting blocks estimated as cold blocks based on the block management information 35. The controller 4 then generates the cold block information 36 based on the block management information 35 and the list of cold blocks (step S44).

The controller 4 further determines whether OP in the cold blocks needs to be collected (step S15). For example, based on whether an OP amount in the cold blocks exceeds a threshold, the controller 4 determines that OP in the cold blocks needs to be collected when the OP amount in the cold blocks exceeds the threshold. When it is determined that OP in the cold blocks need not be collected (NO in step S45), the process returns to step S41.

On the other hand, when it is determined that OP in the cold blocks needs to be collected (YES in step S45), the controller 4 notifies the host 2 of the necessity of collecting OP in the cold blocks (step S45). The controller 4 may transmit the cold block information 36 to the host 2 together with the notification.

A subsequent flowchart in FIG. 14 shows an example of the procedure of a cold block control process executed by the host 2.

The host 2 determines whether a notification indicating a necessity of collecting OP in one or more cold blocks has been received from the SSD 3 (step S51). When it is determined that the notification indicating the necessity of collecting OP in the cold blocks has not been received (NO in step S51), the process returns to step S51.

When it is determined that the notification indicating the necessity for collecting OP in the cold blocks has been received (YES in step S51), the host 2 performs the procedure from step S52 to step S54. The procedure from step S52 to step S54 are similar to the procedure from step S34 to step S36 described above with reference to the flowchart in FIG. 12.

Accordingly, not the host 2 but the SSD 3 is configured to determine a necessity of collecting OP in cold blocks, and the SSD 3 notifies the host 2 of the necessity of collecting OP in the cold blocks.

Third Embodiment

According to the first embodiment, the SSD 3 transmits, to the host 2, the cold block information 36 including a processing time or a processing amount required for collecting OP in a cold block, an OP amount collectable from the cold block, and other information. According to the second embodiment, the SSD 3 notifies the host 2 of information indicating a necessity of collecting OP in one or more cold blocks. On the other hand, an SSD 3 according to a third embodiment transmits a list of logical address ranges of cold data to a host 2.

A configuration of a computer system 1 according to the third embodiment is similar to the configurations of the computer systems 1 of the first and second embodiments. The third embodiment is different from the first and second embodiments only in the point of the procedure of processing executed by a cold block control module 123 of the SSD 3 and a cold block control I/F module 431 of the host 2. Only the different point from the first and second embodiments is hereinafter described.

Figure 15:
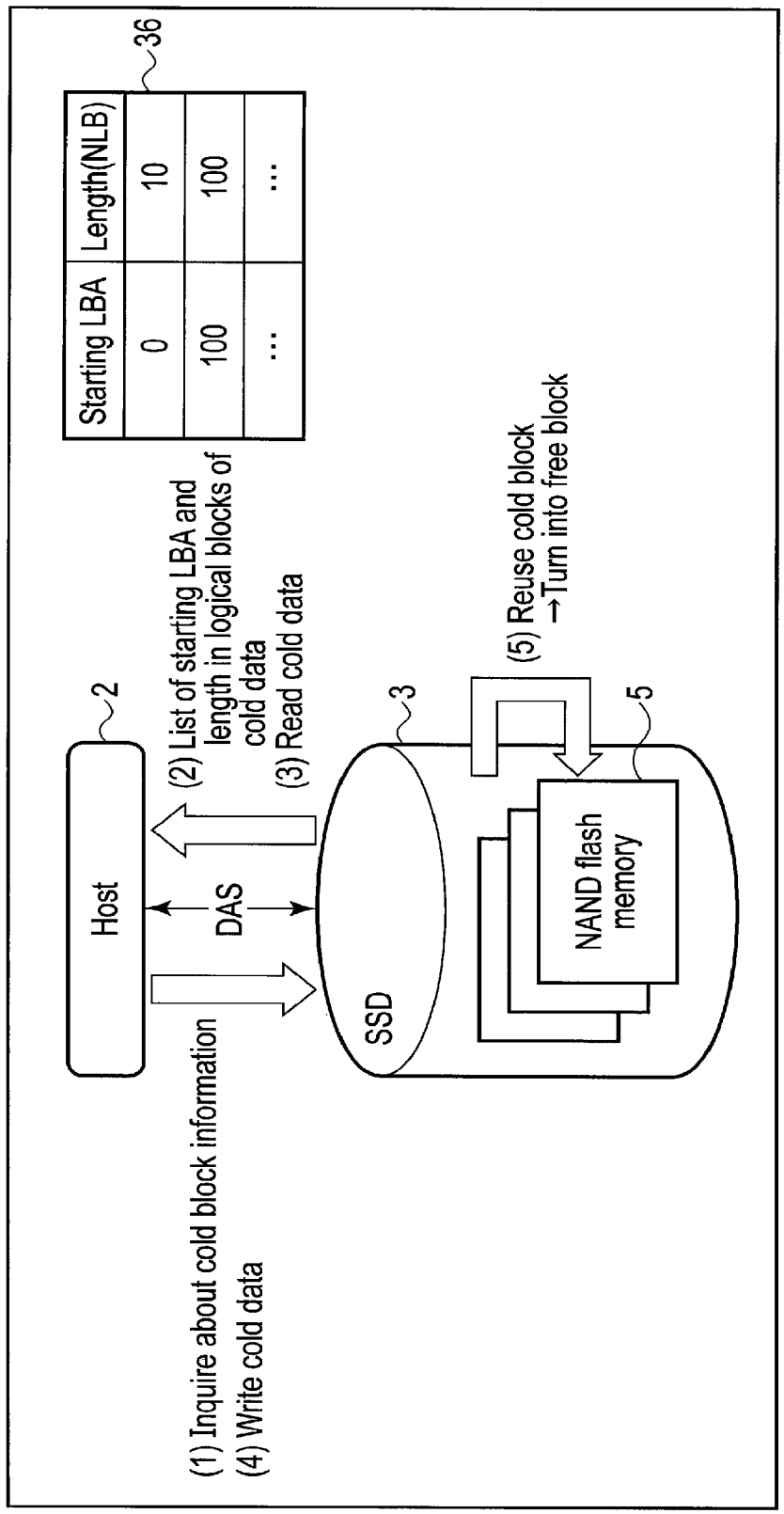
FIG. 15 is a diagram for explaining an example of an operation for collecting OP in a cold block in a computer system according to a third embodiment.

FIG. 15 shows an example of an operation for collecting OP in one or more cold blocks in the computer system 1 according to the present embodiment. The SSD 3 herein functions as a DAS connected to the host 2 with one-to-one correspondence.

Initially, the host 2 inquires of the SSD 3 about cold block information 36. The SSD 3 (controller 4) generates the cold block information 36 in response to this inquiry, and transmits the cold block information 36 to the host 2. The cold block information 36 includes a list of logical address ranges (LBA ranges) corresponding to cold data in a NAND flash memory 5 of the SSD 3. Cold data is valid data in a cold block, and corresponds to an LBA range infrequently accessed.

As illustrated in FIG. 15, the cold block information 36 includes one or more entries each indicating an LBA range of cold data. For example, the LBA range is specified by a starting LBA and a length of the LBA range (e.g., the number of logical blocks). Alternatively, the LBA range may be specified by a starting LBA and an end LBA. Note that the cold block information 36 may further include an OP amount collectable from a cold block, an estimated processing time or processing amount of OP performed by the SSD 3 for turning a cold block into a block to which data is writable (i.e., for collecting OP from the cold block), and other information.

For example, a list of LBA ranges corresponding to pieces of cold data and contained in the cold block information 36 may be generated in a format corresponding to Dataset Management command in conformity with NVMe standard. As illustrated in FIG. 16, up to 256 LBA ranges (from range 0 to range 255) can be indicated in this format, for example. In this format, an item corresponding to each of the LBA ranges contains a starting LBA, a length in logical blocks, and context attributes.

The "starting LBA" indicates a leading LBA in a corresponding LBA range. The "length in logical blocks" indicates the number of logical blocks (NLB) contained in the LBA range. The "context attributes" indicates various types of attributes associated with the LBA range. The size of information corresponding to each LBA range in this format is 16 bytes. Accordingly, the cold block information 36 indicating 256 LBA ranges can be transmitted to the host 2 in units of 4 kibibytes (KiB).

The host 2 issues a read command designating an LBA range of cold data to the SSD 3 based on the cold block information 36 received from the SSD 3. The SSD 3 reads cold data in the designated LBA range from a NAND flash memory 5 in accordance with the read command, and transmits the read cold data to the host 2. In this manner, the host 2 can read cold data from the SSD 3.

The host 2 issues, to the SSD 3, a write command for writing the read cold data. The write command designates the LBA range. Note that the write command may contain information indicating that the data to be written is cold data.

Examples of the information indicating that the data to be written is cold data include an access frequency as one attribute set for the "context attributes" in the dataset management command of NVMe described above. FIG. 17 shows values allowed to be set for a field of an access frequency corresponding to [03:00] bits of the context attributes. According to the example shown in FIG. 17, a value "0010b" or "0011b" indicating infrequent write to a corresponding LBA range is adopted as information indicating that the data to be written is cold data.

The SSD 3 writes the cold data to the NAND flash memory 5 in accordance with the write command. The SSD 3 writes the cold data to a second physical memory area (a write destination block of host write) different from a first physical memory area to which the cold data has been previously written. The SSD 3 may select a block suitable for write of cold data (e.g., a block of which the number of program/erase cycles is large) as a write destination block in accordance with information in the write command that indicates that data to be written is cold data. In this manner, the host 2 can write the cold data newly to the SSD 3.

The reading and writing of cold data in this manner realizes a move of the cold data from a cold block to a write destination block for host write. The SSD 3 updates an LUT 34 such that the LBA range designated by the write command is mapped to the second physical memory area to which the cold data has been newly written. Accordingly, the first physical memory area in the cold block as an area to which the cold data has been previously written becomes an area not mapped to any LBA and storing invalid data.

The host 2 performs the foregoing operation for each LBA range indicated in the cold block information 36. After the SSD 3 moves all the cold data (valid data) in the cold block to the write destination block for host write by performing the foregoing operation, the cold block does not currently store valid data, and becomes a free block. The free block is available for writing new data after subjecting the erase process to the block. Accordingly, collection of OP in the cold block can be achieved.

Note that the block as a target of the operation of OP collection may be a block including data that is to be moved for data retention (reliability). In this case, for example, such data highly likely to cause a retention error is specified based on the number of error bits in error correction during read of a patrol performed for a data retention management. By replacing the cold block information 36 including a list of the LBA ranges corresponding to cold data with information including a list of LBA ranges corresponding to the data thus specified, OP in a block including data likely to cause a retention error can be collected.

Figure 18:
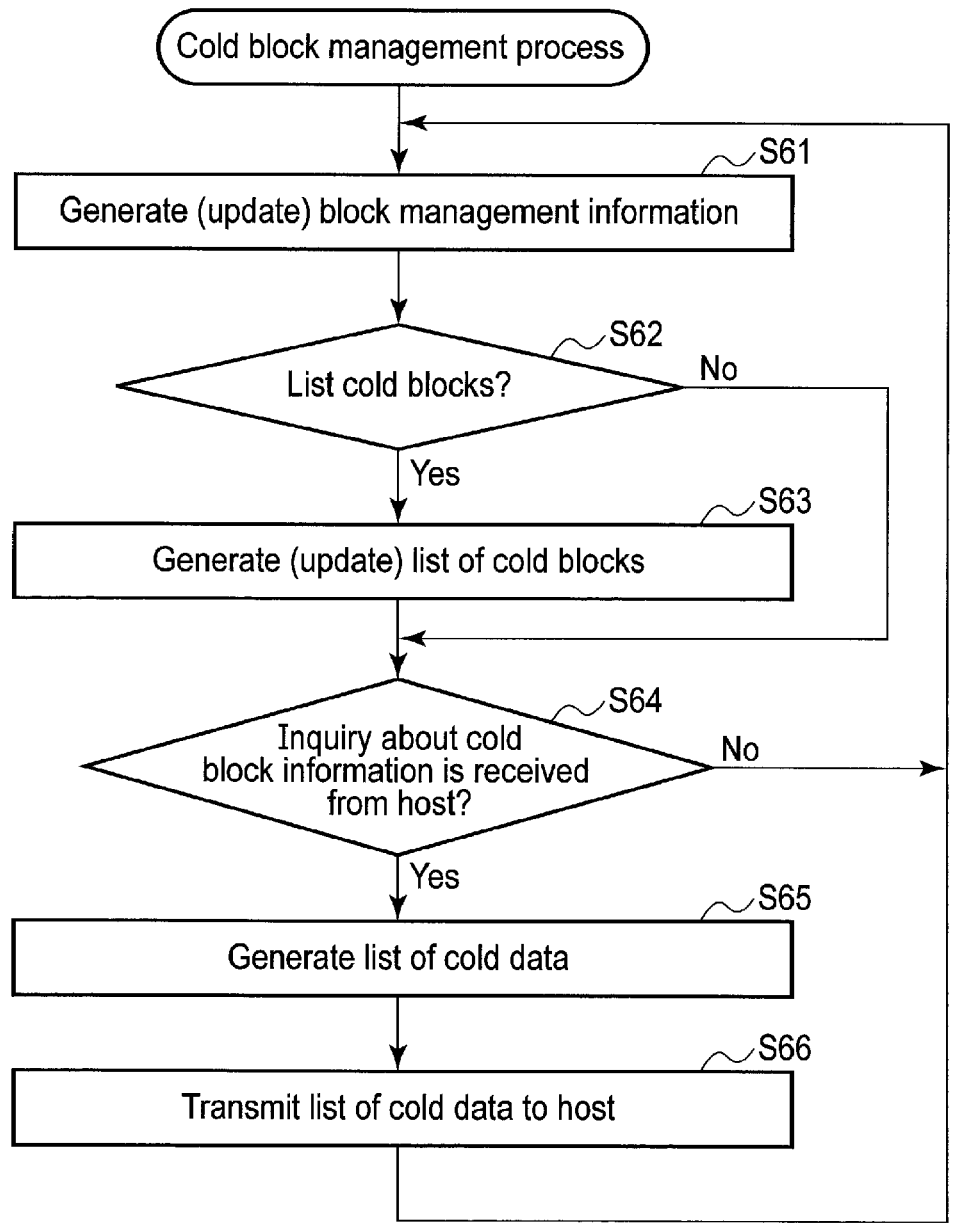
FIG. 18 is a flowchart showing an example of the procedure of a cold block management process executed by the SSD included in the computer system of the third embodiment.

A flowchart in FIG. 18 shows an example of the procedure of a cold block management process executed by the controller 4 of the SSD 3. The procedure from step S61 to step S64 is similar to the procedure from step S11 to step S14 described above with reference to the flowchart in FIG. 10.

When an inquiry about the cold block information 36 is issued from the host 2 to the SSD 3 (YES in step S64), the controller 4 generates the cold block information 36 containing a list of cold data (step S65). For example, the list of cold data is a list in the format illustrated in FIG. 16, and contains a leading LBA (starting LBA) of an LBA range storing cold data, and a length of the LBA range (number of logical blocks (NLB)). The controller 4 transmits, to the host 2, the cold block information 36 containing the generated list of cold data (step S66).

Figure 19:
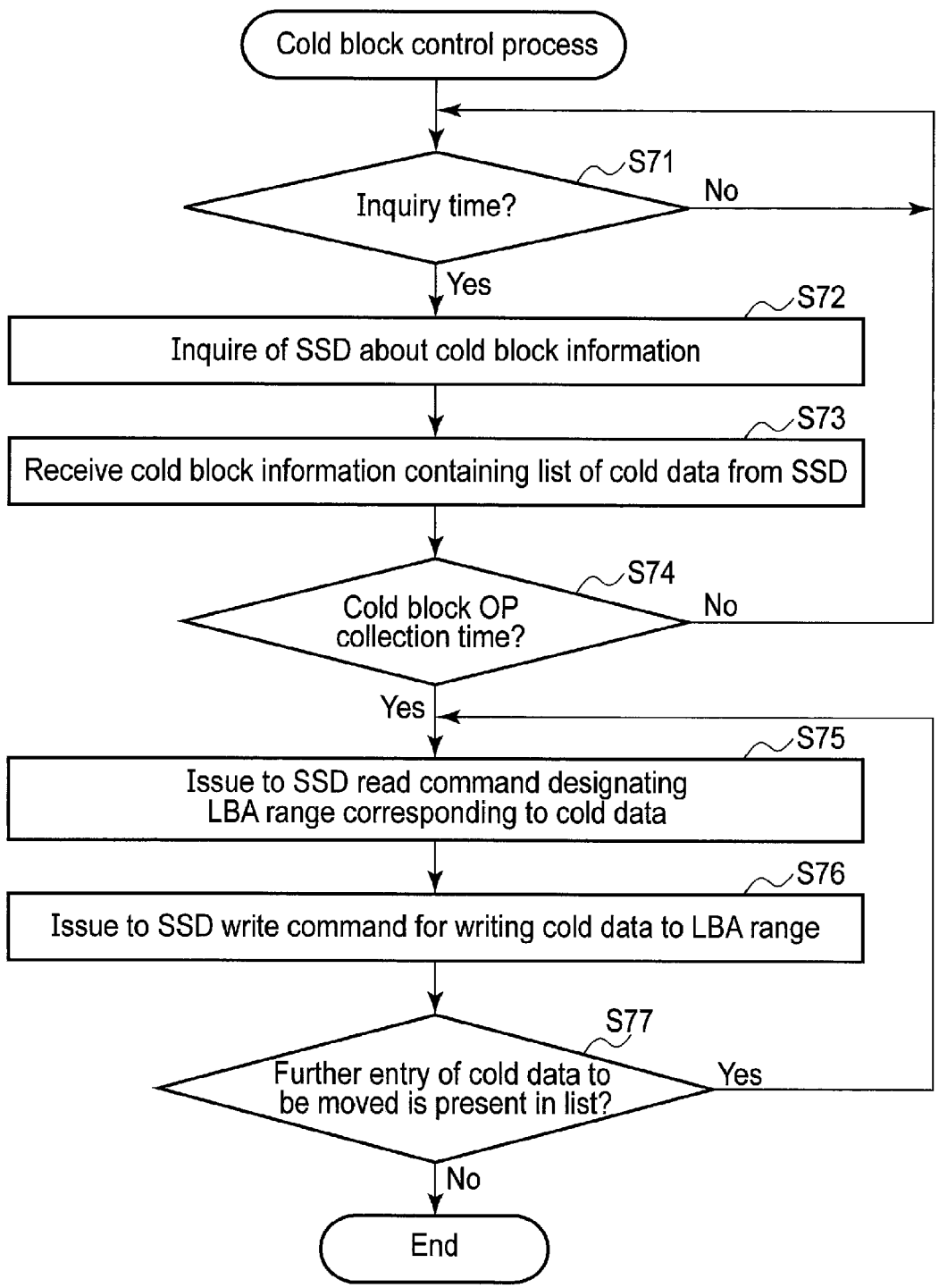
FIG. 19 is a flowchart showing an example of the procedure of a cold block control process executed by the host included in the computer system of the third embodiment.

A subsequent flowchart in FIG. 19 shows an example of the procedure of a cold block control process executed by the host 2.

The host 2 determines whether the current time is a time for inquiring of the SSD 3 about the cold block information 36 (step S71). The host 2 determines that the current time is a time for inquiry about the cold block information 36, for example, at regular time intervals. When the current time is not a time for inquiry about the cold block information 36 (NO in step S71), the process returns to step S71.

When the current time is a time for inquiry about the cold block information 36 (YES in step S71), the host 2 inquires of the SSD 3 about the cold block information 36 (step S72). Subsequently, the host 2 receives the cold block information 36 transmitted from the SSD 3 in response to the inquiry, and containing the list of cold data (step S73). The list of cold data contains one or more entries corresponding to one or more LBA ranges corresponding to cold data.

Subsequently, the host 2 determines whether the current time is a time for collecting OP in one or more cold blocks (step S74). For example, the host 2 detects an infrequently accessing time to the SSD 3 as a time for collecting OP in the cold blocks based on an index such as a small number of processes simultaneously operating on the host 2. When the current time is not determined to be a time for collecting OP in the cold blocks (NO in step S74), the process returns to step S71.

On the other hand, when it is determined that the current time is a time for collecting OP in the cold blocks(YES in step S74), the host 2 issues, to the SSD 3, a read command designating an LBA range corresponding to the cold data based on a certain entry in the list of cold data (step S75). The SSD 3 reads cold data in the designated LBA range in accordance with the read command, and transmits the read cold data to the host 2.

Subsequently, the host 2 issues, to the SSD 3, a write command for writing the read cold data that designates the LBA range (step S76). In accordance with this write command, the SSD 3 writes the cold data not to the first physical memory area where the cold data has been stored, but to a different second physical memory area. The SSD 3 then updates the LUT 34. That is, the SSD 3 associates the LBA range with the second physical memory area, and thereby invalidate the data stored in the first physical memory area. Accordingly, the data stored in the second physical memory area is valid data, while the data stored in the first physical memory area is invalid data.

Subsequently, the host 2 determines whether the list of cold data contains a further entry indicating cold data to be moved (step S77). When a further entry is contained in the list (step S77: YES), the process returns to step S75 to continue a process based on the further entry.

When a further entry is not contained in the list (NO in step S77), i.e., when processing based on all entries in the list is completed, the cold block control process ends.

As described above, the SSD 3 transmits, to the host 2, the cold block information 36 containing a list indicating LBA ranges of cold data. Subsequently, the host 2 issues a read command for reading cold data in an LBA range shown in the list, and a write command for writing the read cold data to this LBA range. In accordance with these commands, cold data in a logical address range shown in the list is moved from a cold block to a new write destination block to collect OP in the cold block. The host 2 is capable of controlling a command issue time. Accordingly, the SSD 3 is allowed to perform an operation for collecting OP in the cold blocks at such a time when the resources of the host 2 or access from the host 2 to the SSD 3 are less affected.

Fourth Embodiment

According to the third embodiment, the SSD 3 transmits, to the host 2, the cold block information 36 containing a list showing logical address ranges of cold data, and moves cold data in a logical address range shown in the list from a cold block to a new write destination block in accordance with commands issued from the host 2 to collect OP in the cold block. In a fourth embodiment, not only cold data in a logical address range shown in a list, but also data at logical addresses around the logical address range of the list are moved to a new write destination block.

A configuration of a computer system 1 according to the fourth embodiment is similar to the configurations of the computer systems 1 of the first to third embodiments. The fourth embodiment is different from the first to third embodiments only in the point of the procedure of a process executed by a cold block control I/F module 431 of a host 2. Only the different point from the first to third embodiments is hereinafter described.

Figure 20:
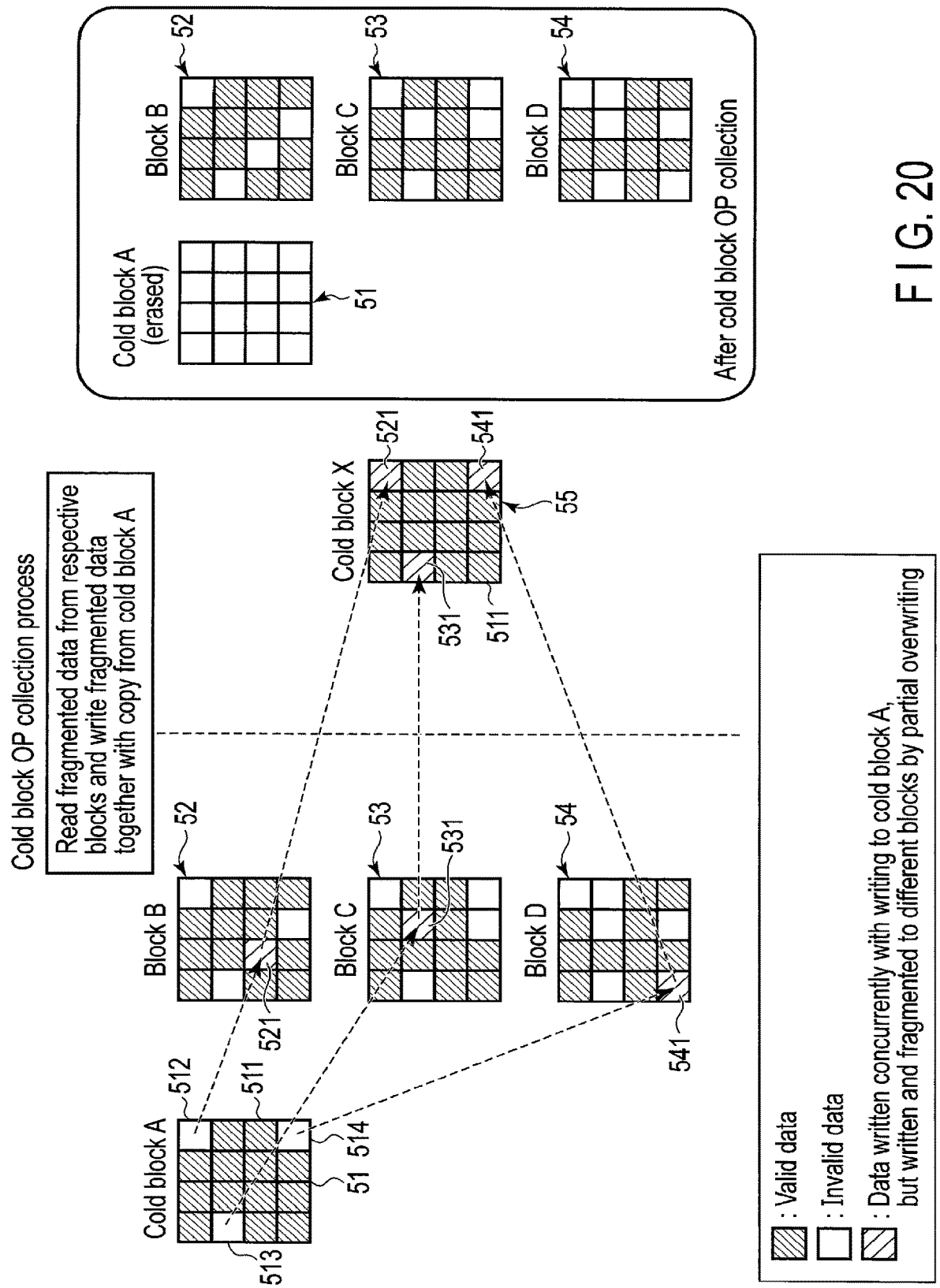
FIG. 20 is a diagram for explaining an example of moving data in LBA around an LBA range of cold data along with collection of OP in a cold block by a computer system according to a fourth embodiment.

According to an example illustrated in FIG. 20, not only cold data in an LBA range but also data at LBAs around the LBA range of the cold data are moved to a new write destination block during collection of OP in a cold block. It is assumed herein that cold block information 36 containing a list of LBA ranges corresponding to cold data (valid data) in a cold block 51 (cold block A) is transmitted from an SSD 3 to the host 2.

The cold block 51 includes valid data 511 and invalid data 512, 513, and 514. The respective pieces of the invalid data 512, 513, and 514 are pieces of data written with the valid data 511 around the same time frame, but invalidated by writing of new data to different blocks 52, 53, and 54 (blocks B, C, and D) in accordance with requests of overwriting to corresponding LBAs.

The LBA is mapped from a physical memory position of the invalid data 512 to a physical memory position of data 521 newly written to the block 52 in response to the request for overwriting to the LBA. The LBA is mapped from a physical memory position of the invalid data 513 to a physical memory position of data 531 newly written to the block 53 in response to the request for overwriting to the LBA. In addition, the LBA is mapped from a physical memory position of the invalid data 514 to a physical memory position of data 541 newly written to the block 54 in response to the request for overwriting to the LBA.

The respective pieces of the data 521, 531, and 541 are construed as pieces of data written concurrently with the valid data 511 at the time of writing to the cold block 51, but written to the different blocks 52, 53, and 54 and fragmented because of partial overwriting (rewriting). In this case, the valid data 511 in the cold block 51, and the data 521, 531, and 541 fragmented in the blocks 52, 53, and 54 originally constitute a series of data written around the same time frame. Improvement of access performance is therefore expectable by collectively writing the respective data 511, 521, 531, and 541 to one block.

Accordingly, the valid data 511 in the cold block 51 is moved to a new write destination block 55 (cold block X), and the respective pieces of the data 521, 531, and 541 are similarly moved to the same write destination block 55 during the process for collecting OP in the cold block 51. The respective pieces of data 511, 521, 531, and 541 may be written to the write destination block 55 in an order equivalent to the order of the corresponding LBAs. By the move in this manner, an LUT 34 is updated such that the physical memory positions in the block 55 to which the respective pieces of the data 511, 521, 531, and 541 have been written are mapped to the LBA range corresponding to the data 511, 521, 531, and 541, while the respective pieces of the pervious data 511, 521, 531, and 541 written to the blocks 51, 52, 53, and 54 are invalidated. As a result, the cold block 51 becomes a free block not storing valid data, and the free block is available for writing of new data after the erase process is subjected to the free block.

Note that data in surrounding LBAs may be moved to a GC destination block during cold block GC in a manner similar to the foregoing manner in the first and second embodiments.

An example of a configuration for realizing the foregoing process is hereinafter described.

As illustrated in FIG. 21, the cold block control I/F module 431 of the host 2 generates a list containing not only an LBA range indicating cold data (valid data) in the cold block 51, but also surrounding LBAs (or LBA ranges) corresponding to data estimated as originally cold data, based on a list of LBA ranges showing the cold data in the cold block 51. Examples of surrounding LBAs include LBAs preceding an LBA range shown in the list, and LBAs following the LBA range.

For example, the cold block control I/F module 431 detects a surrounding LBA of "10" based on an entry of a first LBA range having a starting LBA of "0" and an NLB of "10", and an entry of a second LBA range having a starting LBA of "11" and an NLB of "9". Subsequently, the cold block control I/F module 431 determines whether data at the LBA of "10" is originally cold data. For example, the cold block control I/F module 431 determines that the data at the LBA of "10" is originally cold data when the data at the LBA of "10" is updated (overwritten) data for data written, concurrently with writing of data in the first LBA range and data in the second LBA range, to a cold block to which the data in the first LBA range and the data in the second LBA range have been written, or is updated data for data written to the cold block in the same process as the writing process of the data in the first LBA range and the data in the second LBA range.

When it is determined that the data at the LBA of "10" is originally cold data, the cold block control I/F module 431 changes the list such that the LBA of "10" is further contained in the LBA range of cold data shown in the list. As illustrated in FIG. 21, for example, the cold block control I/F module 431 changes each of the entries of the first LBA range and the second LBA range to an entry having a starting LBA of "0" and an NLB of "20" that includes the first LBA range, the second LBA range, and the LBA "10".

In this case, data located at surrounding LBAs that is originally cold data is moved to a new write destination block as well as cold data in the cold block based on the list thus changed during collection of OP in the cold block. Accordingly, access performance improves while securing sufficient OP.

Figure 22:
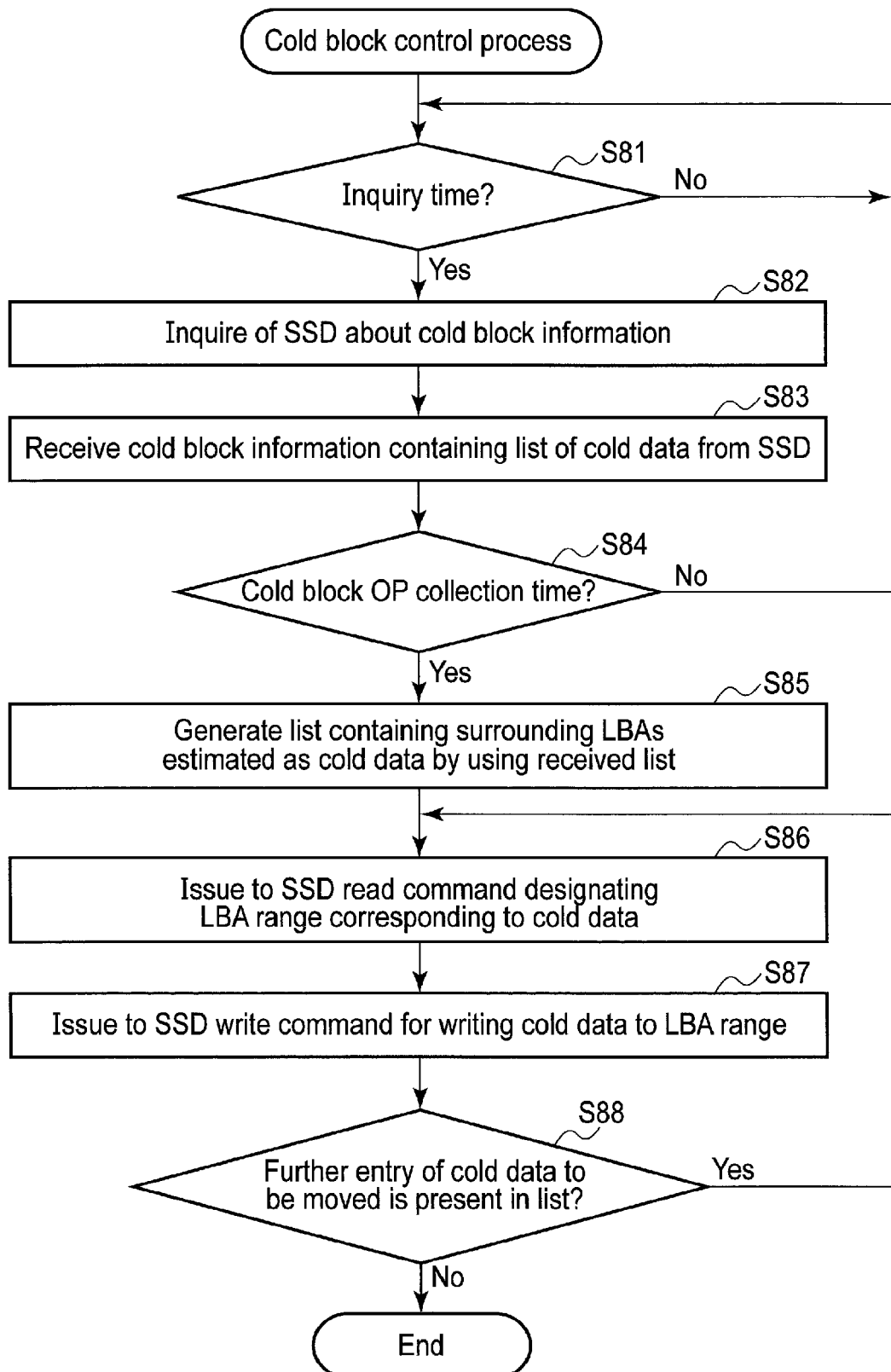
FIG. 22 is a flowchart showing an example of the procedure of a cold block control process executed by a host included in the computer system of the fourth embodiment.

A flowchart in FIG. 22 shows an example of the procedure of a cold block control process executed by the host 2. Procedure from step S81 to step S84 is similar to the procedure from step S71 to step S74 described above with reference to the flowchart in FIG. 19.

When it is determined that the current time is a time for collecting OP in the cold blocks (YES in step S84), the host 2 generates a list further containing surrounding LBAs (LBA ranges) estimated as LBAs storing cold data based on a received list of cold data (step S85). Accordingly, the generated list may contain one or more entries each indicating an LBA range corresponding to cold data, and an LBA (LBA range) of data estimated as cold data, for example.

The host 2 issues, to the SSD 3, a read command designating the LBA range corresponding to at least either the cold data or the data estimated as cold data based on a certain entry shown in the generated list (step S86). The SSD 3 reads data in the designated LBA range in accordance with the read command, and transmits the read data to the host 2.

The host 2 issues, to the SSD 3, a write command for writing the read data that designates the LBA range (step S87). In accordance with this write command, the SSD 3 writes the data not to the first physical memory area where the data has been stored, but to the second physical memory area as a different area. The SSD 3 then updates the LUT 34. That is, the SSD 3 associates the LBA range with the second physical memory area, and thereby invalidate data stored in the first physical memory area. Accordingly, the data stored in the second physical memory area is valid data, while the data stored in the first physical memory area is invalid data.

Subsequently, the host 2 determines whether the list generated in step S85 contains a further entry indicating data to be moved (step S88). When a further entry is contained in the list (YES in step S88), the process returns to step S86 to continue a process based on the further entry.

When a further entry is not contained in the list (NO in step S88), i.e., when processing based on all entries in the list is completed, the cold block control process ends.

Fifth Embodiment

According to the first to fourth embodiments, OP in a cold block of the SSD 3 is collected by moving cold data in the cold block to a different block. In a fifth embodiment, OP in a cold block of an SSD 3 is collected by moving cold data in the cold block to a different storage.

According a configuration of a computer system of the fifth embodiment, a different storage device is added to the computer system 1 of the first to fourth embodiments. The fifth embodiment is different from the first to fourth embodiments only in the point of the procedure of a process executed by a cold block control I/F module 431 and a cold data management module 432 of a host 2. Only the different point from the first to fourth embodiments is hereinafter described.

FIG. 23 shows an example of an operation performed by a computer system 1A which includes a second SSD 7 in addition to the host 2 and a first SSD 3 to collect OP in one or more cold blocks. The first SSD 3 is a hot storage for storing hot data, as a storage corresponding to a target for collecting OP in cold blocks. On the other hand, the second SSD 7 is a cold storage for storing cold data. A hard disk drive (HDD) may be used as the cold storage in place of the second SSD 7. Each of the first SSD 3 and the second SSD 7 functions as a DAS connected to the host 2.

The host 2 inquires of the first SSD 3 about cold block information 36. The first SSD 3 transmits cold block information 36 to the host 2 in response to the inquiry. The cold block information 36 contains a list of logical block address ranges (LBA ranges) corresponding to cold data in a NAND flash memory 5 of the first SSD 3. Details of the cold block information 36 are similar to the details of the cold block information 36 described above with reference to FIGS. 15 and 16.

The host 2 issues a read command designating an LBA range of cold data to the first SSD 3 based on the cold block information 36. The first SSD 3 reads cold data in the designated LBA range from a NAND flash memory 5 in accordance with the read command, and transmits the read cold data to the host 2. In this manner, the host 2 can read cold data from the first SSD 3.

Subsequently, the host 2 issues, to the second SSD 7, a write command for writing the read cold data that designates the LBA range. Note that the write command may contain information indicating that the data to be written is cold data as illustrated in FIG. 17.

The second SSD 7 writes the cold data to a NAND flash memory in the second SSD 7 in accordance with the write command. The second SSD 7 may select a block suitable for write of the cold data (e.g., block of which the number of program/erase cycles is large) as a write destination block based on information indicating that the data contained in the write command as data to be written is cold data. The second SSD 7 further updates an LUT in the second SSD 7 such that the LBA range designated by the write command is mapped to a physical memory area to which the cold data has been written. In this manner, the host 2 can write the cold data to the second SSD 7.

The reading and writing of cold data in this manner realizes a move of the cold data from a cold block in the first SSD 3 to a write destination block for host write in the second SSD 7. The host 2 issues a trim command designating the LBA range of the moved data to the first SSD 3. The first SSD 3 updates an LUT 34 such that the LBA range designated by the trim command is set in an unmapped state where the LBA range is not mapped in any physical memory area. Accordingly, the physical memory area in the cold block to which the cold data has been previously written becomes an area storing invalid data not mapped to any LBA.

The cold data management module 432 of the host 2 manages which of the SSD 3 and the SSD 7 data in a certain LEA range is stored in. For example, when data in a certain LEA range is moved from the first SSD 3 to the second SSD 7, the cold data management module 432 manages a state that the data in the LBA range is stored in the second SSD 7. For example, an LBA range—storage management table 412A is used for this management.

FIG. 24 illustrates a configuration example of the LBA range-storage management table 412A. The LBA range—storage management table 412A contains one or more records corresponding to one or more LBA ranges. Each record contains a starting LBA, a length (number of logical blocks), and a storage identification (ID), for example.

The "starting LBA" in a record corresponding to a certain LBA range indicates a leading LBA in the corresponding LBA range. The "length" indicates the number of logical blocks (NLB) contained in the LBA range. The "storage ID" indicates identification information of a storage that stores data in the LBA range. For example, in case of a configuration of the computer system 1 illustrated in FIG. 23, either identification information given to the first SSD 3 ("0001" in this example), or identification information given to the second SSD 7 ("0002" in this example) is set for the "storage ID".

As illustrated in FIG. 24, for example, when data at an LBA range having a starting LBA of "500" and an NLB of "80" is moved from the first SSD 3 (storage ID "0001") to the second SSD 7 (storage ID "0002"), the cold data management module 432 changes a storage ID set for a record, which corresponds to the LBA range having the starting LBA of "500" and the NLB of "80", from "0001" to "0002".

When an access to a certain LBA range is requested, the cold data management module 432 controls such that a storage having a storage ID associated with this LBA range is accessed (e.g., command is issued to corresponding storage) based on the LBA range—storage management table 412A. When an access to the LBA range having the starting LBA of "500" and the NLB of "80" is requested, for example, the cold data management module 432 controls such that the second SSD 7 is accessed based on the updated LBA range—storage management table 412A illustrated in FIG. 24.

For example, the host 2 performs the operation described above to move cold data from the first SSD 3 to the second SSD 7 for each LBA range shown in the cold block information 36. After all the cold data (valid data) contained in the cold block in the first SSD 3 is moved to the write destination block for host write in the second SSD 7 by performing the foregoing operation, the cold block becomes a free block not storing valid data. After subjecting an erase process to the free block, the free block is available for writing new data. Accordingly, OP in the cold block can be collected.

A flowchart in FIG. 25 shows an example of the procedure of a cold block control process executed by the host 2.

The host 2 determines whether the current time is a time for inquiring of the first SSD 3 about the cold block information 36 (step S91). The host 2 determines that the current time is a time for inquiring of the first SSD 3 about the cold block information 36, for example, at regular time intervals. When the current time is not a time for inquiry about the cold block information 36 (NO in step S91), the process returns to step S91.

When the current time is a time for inquiry about the cold block information 36 (YES in step S91), the host 2 inquires of the first SSD 3 about the cold block information 36 (step S92). Subsequently, the host 2 receives the cold block information 36 transmitted from the first SSD 3 (step S93). The cold block information 36 contains a list of cold data. The list of cold data contains one or more entries corresponding to one or more LBA ranges corresponding to cold data.

Subsequently, the host 2 determines whether the current time is a time for collecting OP in one or more cold blocks in the first SSD 3 (step S94). For example, the host 2 detects an infrequently accessing time to the first SSD 3 as a time for collecting OP in the cold blocks based on an index such as the small number of processes simultaneously operating on the host 2. When the current time is not determined to be a time for collecting OP in the cold blocks (NO in step S94), the process returns to step S91.

On the other hand, when it is determined that the current time is a time for collecting OP in the cold blocks (YES in step S94), the host 2 issues, to the first SSD 3, a read command designating an LBA range corresponding to cold data based on an entry in the list of cold data (step S95). The first SSD 3 reads cold data in the designated LBA range in accordance with the read command, and transmits the read cold data to the host 2.

Subsequently, the host 2 issues, to the second SSD 7, a write command for writing the read cold data that designates the LBA range (step S96). The second SSD 7 writes the cold data to a physical memory position in accordance with the write command. Subsequently, the second SSD 7 updates the LUT by associating the LBA range with the physical memory position.

After completion of writing by the second SSD 7, the host 2 issues a trim command designating the LBA range to the first SSD 3 (step S97). The first SSD 3 invalidates data in the physical memory area corresponding to the designated LBA range, i.e., data in the physical memory area to which the cold data has been written. That is, the first SSD 3 updates the LUT 34 to set the designated LBA range in an unmapped state where the designated LBA range is not mapped to any physical memory area.

Subsequently, the host 2 updates a record corresponding to the LBA in the LBA range—storage management table 412A such that the LBA range—storage management table 412A shows such a state that the data corresponding to the LBA range is stored in the second SSD 7 (step S98). Accordingly, when accessing to the data in the LBA range, the host 2 can determine that a command designating the LBA range is to be issued to the second SSD 7 based on the LBA range—storage management table 412A.

Subsequently, the host 2 determines whether the list of cold data contains a further entry indicating cold data to be moved (step S99). When a further entry is contained in the list (YES in step S99), the process returns to step S95 to continue a process based on the further entry.

When a further entry is not contained in the list (NO in step S99), i.e., when processing based on all entries in the list is completed, the cold block control process ends.

According to the configuration described above, when the second SSD 7 (cold storage) is additionally provided, cold data in a cold block in the first SSD 3 (hot storage) is moved to the second SSD 7. Accordingly, OP in the cold block can be collected without consuming the band width of NAND access of the first SSD 3 for host write. In addition, separation between cold data and hot data is achievable by the use of the separate SSDs 3 and 7.

Sixth Embodiment

According to the fifth embodiment, cold data in a cold block of the first SSD 3 is written to the second SSD 7 functioning as a DAS connected to the host 2. In a sixth embodiment, cold data in a cold block of a first SSD 3 is written to a different storage connected to a host 2 via a network.

According to a configuration of a computer system of the sixth embodiment, the second SSD 7 included in the computer system 1A of the fifth embodiment and connected to the host 2 is not provided as a DAS, but is connected via a network. The sixth embodiment is different from the first to fifth embodiments only in the point of the procedure of a process executed by a cold block control I/F module 431 of the host 2. Only the different point from the first to fifth embodiments is hereinafter described.

Figure 26:
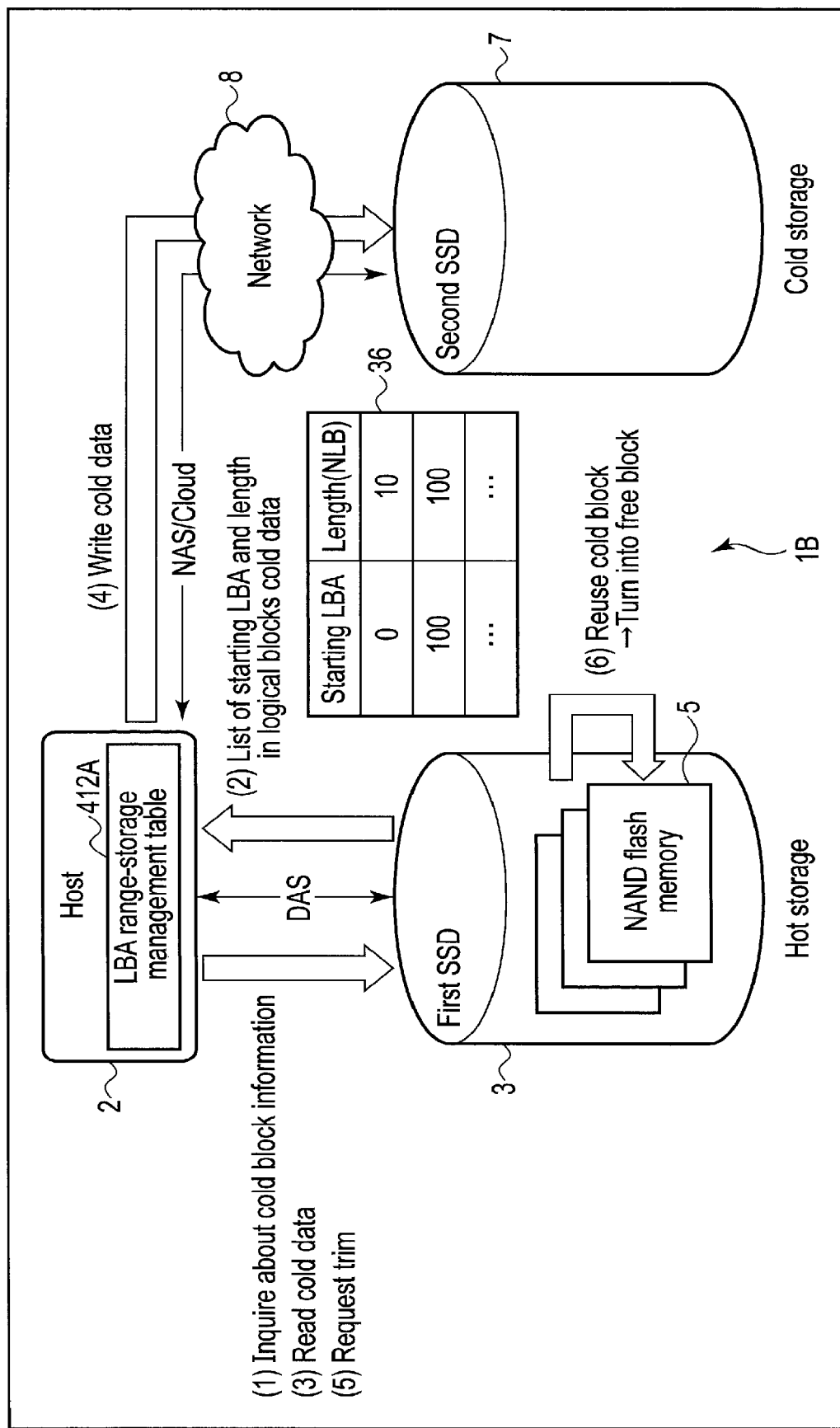
FIG. 26 is a diagram for explaining an example of an operation for collecting OP in a cold block in a computer system according to a sixth embodiment.

FIG. 26 shows an example of an operation performed by a computer system 1B which includes a second SSD 7 in addition to the host 2 and the first SSD 3 to collect OP in one or more cold blocks. The first SSD 3 is a hot storage for storing hot data, as a storage corresponding to a target for collecting OP in a cold block. On the other hand, the second SSD 7 is a cold storage for storing cold data. Note that an HDD may be used as the cold storage in place of the second SSD 7, or multiple cold storages may be provided in the computer system 1B. The first SSD 3 as a DAS is connected to the host 2. On the other hand, the second SSD 7 is a storage connected to the host 2 via a network 8, such as a network access server (NAS) or a cloud storage.

The host 2 inquires of the first SSD 3 about cold block information 36. The first SSD 3 transmits cold block information 36 to the host 2 in response to the inquiry. The cold block information 36 contains a list of logical address ranges (LBA ranges) corresponding to cold data in a NAND flash memory 5 of the first SSD 3. Details of the cold block information 36 are similar to the details of the cold block information 36 described above with reference to FIGS. 15 and 16.

The host 2 issues a read command designating an LBA range of cold data to the first SSD 3 based on the cold block information 36. The first SSD 3 reads cold data in the designated LBA range from the NAND flash memory 5 in accordance with the read command, and transmits the read cold data to the host 2. In this manner, the host 2 can read cold data from the first SSD 3.

Subsequently, the host 2 issues, to the second SSD 7 via the network 8, a write command for writing the read cold data that designates the LBA range. Note that the write command may contain information indicating that the data to be written is cold data as illustrated in FIG. 17.

The second SSD 7 writes the cold data to a NAND flash memory in the second SSD 7 in accordance with the write command. The second SSD 7 may select a block suitable for write of the cold data (e.g., block of which the number of program/erase cycles is large) as a write destination block based on information indicating that the data contained in the write command as data to be written is cold data. The second SSD 7 further updates an LUT in the second SSD 7 such that the LBA range designated in the write command is mapped to a physical memory area to which the cold data has been written. In this manner, the host 2 can write the cold data to the second SSD 7.

The reading and writing of cold data in this manner realizes a move of the cold data from the cold block in the first SSD 3 to the write destination block for host write in the second SSD 7. The host 2 issues a trim command designating the LBA range of the moved data to the first SSD 3. The first SSD 3 updates an LUT 34 such that the LBA range designated by the trim command is set in an unmapped state where the LBA range is not mapped to any physical memory area. Accordingly, the physical memory area in the cold block to which the cold data has been previously written becomes an area storing invalid data not mapped to any LBA.

The cold data management module 432 of the host 2 manages which of the SSD 3 and the SSD 7 data in a certain LBA range is stored in. For example, when data in a certain LBA range is moved from the first SSD 3 to the second SSD 7, the cold data management module 432 manages a state that the data in this LBA range is stored in the second SSD 7 connected via the network 8.

For example, an LBA range—storage management table 412A is used for this management. Details of the LBA range—storage management table 412A are similar to the details of the LBA range—storage management table described above with reference to FIG. 24. Note that when data in an LBA range is stored in the second SSD 7 connected via the network 8, a position on the network may be managed in place of the "storage ID" in the LBA range—storage management table 412A.

When an access to an LBA range is requested, the cold data management module 432 controls such that a storage at a position on the network associated with the LBA range is accessed (e.g., command can be issued to the storage) based on the LBA range—storage management table 412A.

According to the configuration described above, when the second SSD 7 is provided via the network 8, cold data in a cold block in the first SSD 3 (hot storage) is similarly moved to the second SSD 7 (cold storage). Accordingly, OP in the cold block can be collected without consuming the band width of NAND access of the first SSD 3 for host write. In addition, separation between cold data and hot data is achievable by the use of the separate SSDs 3 and 7.

Seventh Embodiment

According to the first and second embodiments, the host 2 requests the SSD 3 to collect OP in a cold block (execute cold block GC). In addition, according to the third to sixth embodiments, the host 2 reads cold data from the SSD 3 and writes the cold data to the SSD 3 to collect OP in a cold block. In a seventh embodiment, OP collection in a cold block starts in response to a request from a host 2 similarly to the first and second embodiments. In the OP collection, an SSD 3 writes cold data in the cold block to a different SSD 7 to collect OP in the cold block.

According to a configuration of a computer system of the seventh embodiment, connection not only between the host 2 and the SSD 7, but also between the SSD 3 and the SSD 7 are made via a network 8 in the computer system 1B of the sixth embodiment. The seventh embodiment is different from the first to sixth embodiments only in the point of the procedure of a process executed by a cold block control module 123 of the SSD 3. Only the different point from the first through sixth embodiments is hereinafter described.

Figure 27:
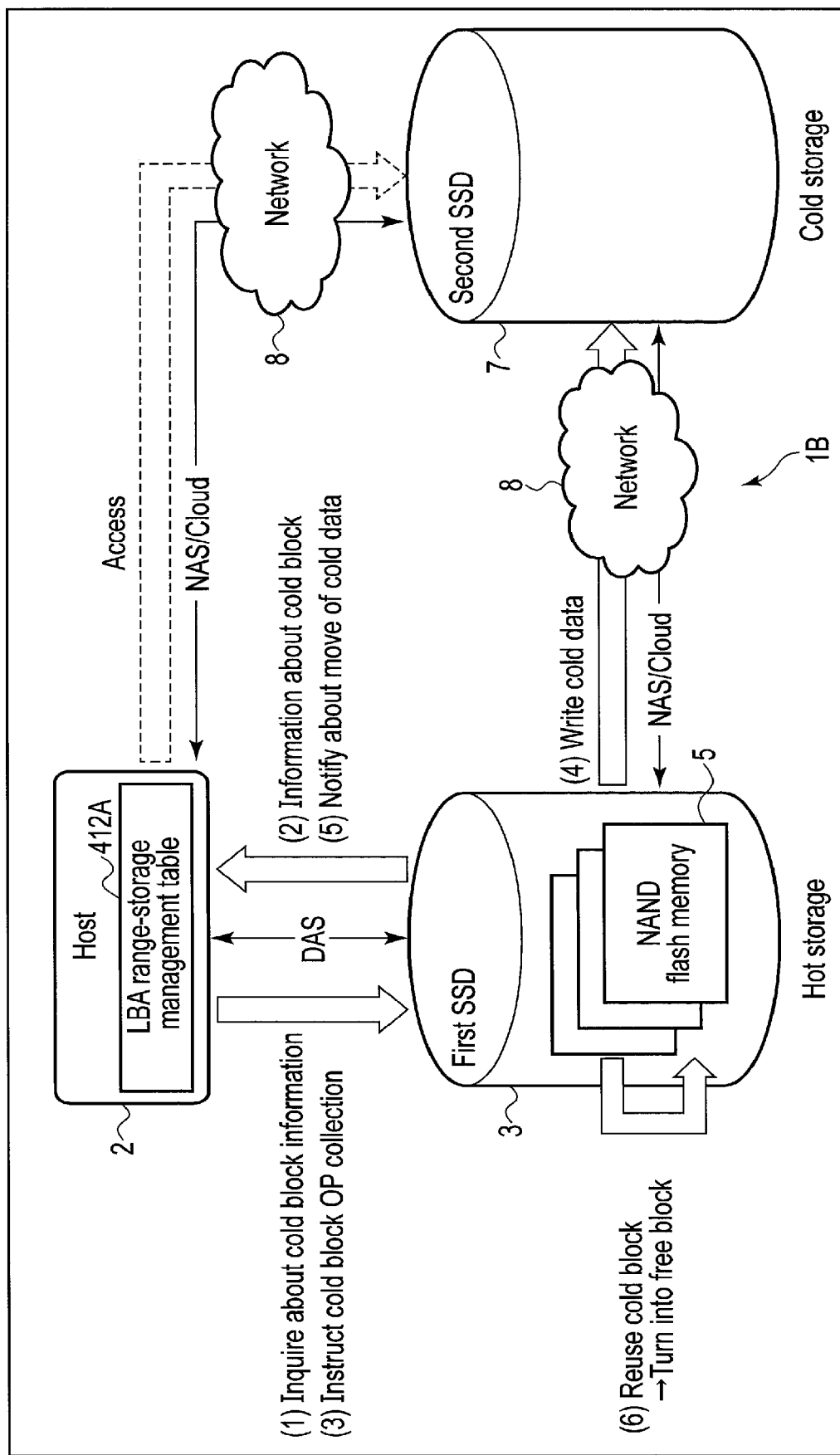
FIG. 27 is a diagram for explaining an example of an operation for collecting OP in a cold block in a computer system according to a seventh embodiment.

FIG. 27 shows an example of an operation for collecting OP in a cold block in a computer system 1B which further includes the second SSD 7 in addition to the host 2 and the first SSD 3. The first SSD 3 is a hot storage for storing hot data, as a storage corresponding to a target for collecting OP in a cold block. On the other hand, the second SSD 7 is a cold storage for storing cold data. Note that an HDD may be used as the cold storage in place of the second SSD 7, or the computer system 1B may include multiple cold storages. The first SSD 3 as a DAS is connected to the host 2. On the other hand, the second SSD 7 is a storage connected to the host 2 via a network 8, such as a NAS or a cloud storage. In addition, the first SSD 3 and the second SSD 7 are connected to each other via the network 8.

The host 2 inquires of the first SSD 3 about cold block information 36. The first SSD 3 transmits cold block information 36 to the host 2 in response to the inquiry. For example, the cold block information 36 includes an OP amount collectable from a cold block, a processing time or a processing amount estimated when only an operation for collecting OP from the cold block is performed, and others.

The host 2 determines whether to instruct the first SSD 3 to collect OP in one or more cold blocks based on the cold block information 36. For example, the host 2 instructs the first SSD 3 to collect OP in the cold blocks when access from the host 2 is less affected by execution of an operation for collecting OP in the cold blocks, such as a case where the host 2 is in an idling state. The first SSD 3 starts execution of a process for collecting OP in the cold blocks in response to an instruction from the host 2.

The first SSD 3 (read control module 124) reads cold data (valid data) from a cold block shown in a list of cold blocks. The list of cold blocks is contained in the cold block information 36, for example. It is assumed herein that the read cold data is data corresponding to a first LBA range.

The first SSD 3 issues, to the second SSD 7, a write command for writing the read cold data that designates the first LBA range. Note that the write command may contain information indicating that the data to be written is cold data as illustrated in FIG. 17.

The second SSD 7 writes the cold data to a NAND flash memory in the second SSD 7 in accordance with the write command. The second SSD 7 may select a block suitable for write of the cold data (e.g., a block of which the number of program/erase cycles is large) as a write destination block based on information indicating that the data contained in the write command as data to be written is cold data. The second SSD 7 further updates an LUT in the second SSD 7 such that the LBA range designated in the write command is mapped to a physical memory area to which the cold data has been written. In this manner, the first SSD 3 can write the cold data to the second SSD 7.

The reading and writing of cold data in this manner realizes a move of the cold data from a cold block in the first SSD 3 to a write destination block in the second SSD 7. The first SSD 3 updates an LUT 34 such that the first LBA range of the cold data moved to the second SSD 7 is set in an unmapped state where the first LBA range is not mapped to any physical memory area in the first SSD 3. Accordingly, the physical memory area in the cold block to which the cold data has been previously written becomes an area storing invalid data not mapped to any LBA.

Subsequently, the first SSD 3 notifies the host 2 of the move of the data in the first LBA range from the first SSD 3 to the second SSD 7.

A cold data management module 432 of the host 2 manages the state that the data in the first LBA range is stored in the second SSD 7 based on the notification from the first SSD 3. For example, an LBA range—storage management table 412A is used for this management. Details of the LBA range—storage management table 412A are similar to the details of the LBA range—storage management table described above with reference to FIG. 24. Note that when data in an LBA range is stored in the second SSD 7 connected via the network 8, a position on the network may be managed in place of the "storage ID" in the LBA range—storage management table 412A.

When an access to an LBA range is requested, the cold data management module 432 controls such that a storage at a position on the network associated with the LBA range is accessed (e.g., a command can be issued to the storage) based on the LBA range—storage management table 412A.

According to the configuration described above, the first SSD 3 moves cold data in a cold block in the first SSD 3 (hot storage) to the second SSD 7 (cold storage) in response to an instruction issued from the host 2 for collecting OP in the cold block. Accordingly, OP in the cold block can be collected without consuming the band width of NAND access of the first SSD 3 for host write. In addition, separation between cold data and hot data is achievable by the use of the separate SSDs 3 and 7.

A flowchart in FIG. 28 shows an example of the procedure of an OP collection control process executed by a controller 4 of the first SSD 3.

The controller 4 determines whether collection of OP in one or more cold blocks has been instructed by the host 2 (step S201). When it is determined that collection of OP in the cold blocks has not been instructed (NO in step S201), the process returns to step S201.

When it is determined that collection of OP in the cold blocks has been instructed (YES in step S201), the controller 4 reads cold data (valid data) in a cold block shown in a list of cold blocks (step S202). Subsequently, the controller 4 issues, to the second SSD 7 via a network 8, a write command for writing the read cold data to an LBA range corresponding to a physical memory area where the cold data has been stored in the SSD 3 (step S203). The second SSD 7 writes the cold data to a physical memory area in accordance with the write command. Subsequently, the second SSD 7 updates the LUT by associating the LBA range with the physical memory area.

After completion of writing by the second SSD 7, the controller 4 updates the LOT 34 to set the LBA range in an unmapped state where the LBA range is not mapped to any physical memory area, and thereby invalidate data in the physical memory area corresponding to the LBA range, i.e., physical memory area to which the cold data has been written (step S204). Subsequently, the controller 4 notifies the host 2 of the move of the cold data in the LBA range to the second SSD 7 (step S205).

Subsequently, the controller 4 determines whether further cold data to be moved is present (step S206). For example, the controller 4 determines that further cold data to be moved is present when the cold block still contains cold data not moved yet, or when a further cold block not processed yet is present. When further cold data to be moved is present (YES in step S206), the process returns to step S202 to continue a process for moving the further cold data to the second SSD 7.

When further cold data to be moved is absent (NO in step S206), i.e., when a move of all cold data to the second SSD 7 is completed, the controller 4 notifies the host 2 of completion of collection of OP in the cold block (step S207).

A subsequent flowchart in FIG. 29 shows an example of the procedure of a cold block control process executed by the host 2.

The host 2 determines whether the current time is a time for inquiring of the first SSD 3 about the cold block information 36 (step S301). For example, the host 2 determines that the current time is a time for inquiring of the first SSD 3 about the cold block information 36 at regular time intervals. When the current time is not a time for inquiry about the cold block information 36 (NO in step S301), the process returns to step S301.

When the current time is a time for inquiry about the cold block information 36 (YES in step S301), the host 2 inquires of the first SSD 3 about the cold block information 36 (step S302). Subsequently, the host 2 receives the cold block information 36 transmitted from the first SSD 3 (step S303).

Subsequently, the host 2 determines whether the current time is a time for instructing the first SSD 3 to collect OP in one or more cold blocks (step S304). The host 2 detects an infrequently accessing time to the first SSD 3 as a time for issuing an instruction for collecting OP in the cold blocks based on an index such as a small number of processes simultaneously operating on the host 2. When the current time is not determined to be a time for issuing an instruction for collecting OP in the cold blocks (NO in step S304), the process returns to step S301.

On the other hand, when the current time is determined to be a time for issuing an instruction for collecting OP in the cold blocks (YES in step S304), the host 2 issues a request for collecting OP in the cold blocks to the first SSD 3 (step S305).

Subsequently, the host 2 determines whether a notification about a move of the cold data from the first SSD 3 has been received (step S306). This notification contains information that indicates an LBA range corresponding to the moved cold data. When it is determined that a notification about the move of the cold data has not been received (NO in step S306), the process returns to step S306.

When notification about the move of the cold data has been received (YES in step S306), a record contained in the LBA range—storage management table 412A, which corresponds to an LBA indicated in the notification, is updated to indicate that data corresponding to the LBA range is stored in the second SSD 7 (step S307). Accordingly, when accessing to data in a certain LBA range, the host 2 can determine to which storage a command is to be issued based on the LBA range—storage management table 412A.

Subsequently, the host 2 determines whether a notification of completion of OP collection has been received (step S308). When it is determined that a notification of completion has not been received (NO in step S308), the process returns to step 5306. On the other hand, when it is determined that a notification of completion has been received (YES in step S308), the process ends.

According to the configuration described above, when the second SSD 7 (cold storage) is provided via the network 8, cold data in a cold block in the first SSD 3 (hot storage) is moved to the second SSD 7 by the operation of the first SSD 3 in response to a request from the host 2. Accordingly, OP in the cold block can be collected without consuming the band width of NAND access of the first SSD 3. In addition, separation between cold data and hot data is achievable by the use of the separate SSDs 3 and 7.

FIG. 30 illustrates a hardware configuration example of an information processing device (computing device) which functions as the host 2 in any one of the first to seventh embodiments.

The information processing device is implemented as a computing device such as a server (e.g., storage server). The information processing device includes a processor (CPU) 101, a main memory 102, a BIOS-ROM 103, a network controller 105, a peripheral interface controller 106, a controller 107, an embedded controller (EC) 108, and others.

The processor 101 is a CPU configured to control operations of respective components of the information processing device. The processor 101 executes various types of programs loaded from any one of the SSDs 3 to the main memory 102. The main memory 102 is constituted by a random access memory such as DRAM. The programs executed by the processor 101 include the application layer 41, the OS 42, and the file system 43 described above.

The processor 101 further executes a basic input/output system (BIOS) stored in the BIOS-ROM 103 as a nonvolatile memory. The BIOS is a system program for hardware control.

The network controller 105 is a communication device such as a wired local area network (LAN) controller and a wireless LAN controller. For example, data transmission and reception to and from a storage device such as the SSD 7 is achievable by wired communication or wireless communication using the network controller 105.

The peripheral interface controller 106 is configured to perform communication with a peripheral device such as a USB device.

The controller 107 is configured to perform communication with devices respectively connected to connectors 107A. Multiple SSDs 3 may be connected to the connectors 107A, respectively. The controller 107 is constituted by SAS expander, PCIe switch, PCIe expander, flash array controller, or RAID controller, for example.

The EC 108 functions as a system controller configured to execute power management of the information processing device. The EC 108 powers on or off the information processing device in accordance with an operation input to a power switch from a user. The EC 108 is implemented as a processing circuit such as a one-chip microcontroller. The EC 108 may include a built-in keyboard controller for controlling an input device such as a keyboard.

According to the first to seventh embodiments described above, redundant capacity (OP) in a cold block can be collected while reducing effect on access from the host. For example, the controller 4 of the SSD 3 transmits, to the host 2, the cold block information 36 which indicates a first logical address range corresponding to cold data stored in the NAND flash memory 5, and a processing amount for turning a cold block containing the cold data into a block to which data is writable. The processor 101 of the host 2 receives the cold block information 36, and issues a read command designating the first logical address range to the SSD 3. The controller 4 reads the cold data from the NAND flash memory 5 in accordance with the read command, and transmits the read cold data to the host 2. The processor 101 receives the cold data, and issues, to the SSD 3, a write command for writing the received cold data that designates the first logical address range. The controller 4 writes, to the NAND flash memory 5, the cold data received with the write command.

According to the computer system 1 thus configured, the host 2 is capable of controlling a time for issuing a read command and a write command. Accordingly, OP in a cold block stored in the SSD 3 can be collected without consuming the band width of NAND access for host write at a time unexpected for the host 2. The host 2 is capable of recognizing a state of cold data stored in the SSD 3, and appropriately managing the cold data in accordance with purposes of use.

In addition, each of the functions described in the first to seventh embodiments may be implemented by a circuit (processing circuit). Examples of the processing circuit include a programmed processor, such as a central processing unit (CPU). The processor executes computer programs (instructions) stored in a memory to perform the respective functions described herein. The processor may be a microprocessor including an electric circuit. Examples of the processing circuit include a digital signal processor (DSP), an application specific integrated circuit (ASIC), a microcontroller, a controller, and other types of electric circuit parts. Each of the components described in the respective embodiments other than the CPU may be also implemented by a processing circuit.

In addition, the respective types of processes in the first to seventh embodiments may be implemented by computer programs. Accordingly, advantageous effects similar to those of the respective embodiments are easily offered only by execution of the programs installed in a computer via a storage medium which stores the programs and is readable by the computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device connectable to a host via an interface, the electronic device comprising:
   a nonvolatile memory that includes blocks; and
   a controller electrically connected to the nonvolatile memory, wherein
   when the electronic device is connected to the host, the controller is configured to:
   transmit information to the host, wherein the information indicates a first logical address range corresponding to cold data stored in the nonvolatile memory, and a processing amount for turning a cold block that comprises the cold data into a block to which data is writable;
   read the cold data from the nonvolatile memory in accordance with a read command that is received from the host and designates the first logical address range, and
transmit the read cold data to the host; and write, to the nonvolatile memory, the cold data that is received with a write command designating the first logical address range from the host.

2. The electronic device of claim 1, wherein the controller is configured to:

transmit, to the host, information that indicates the first logical address range corresponding to a first physical memory area in the nonvolatile memory, in response to an inquiry received from the host when the cold data is stored in the first physical memory;

read the cold data from the nonvolatile memory in accordance with a read command that is received from the host and designates the first logical address range, and transmit the read cold data to the host; and write, to a second physical memory area in the nonvolatile memory, the cold data that is received with a write command designating the first logical address range from the host.

3. The electronic device of claim 1, wherein the first logical address range is specified by a starting logical address of the first logical address range, and a number of logical blocks included in the first logical address range.

4. The electronic device of claim 1, wherein an access frequency to the first logical address range is lower than a threshold.

5. The electronic device of claim 1, wherein the cold block is a block erased a number of times smaller than a threshold, or a block of which an erasing sequence number is smaller than a particular number, and the cold data is valid data in the cold block.

6. The electronic device of claim 1, wherein when the electronic device is connected to the host, the controller is further configured to:

transmit, to the host, information that indicates a processing amount for turning one or more cold blocks in the nonvolatile memory into one or more blocks to which data is writable, in response to an inquiry received from the host; and execute a process for turning the one or more cold blocks into one or more blocks to which data is writable in response to a request received from the host.

7. The electronic device of claim 1, wherein when the electronic device is connected to the host, the controller is further configured to transmit to second information to the host when invalid data amount included in one or more cold blocks in the nonvolatile memory exceeds a threshold, wherein the second information indicates that the invalid data amount exceeds the threshold or performing a process for turning the one or more cold blocks into one or more blocks to which data is writable is needed.

8. The electronic device of claim 1, wherein the write command comprises information that indicates that data to be written is cold data.

9. The electronic device of claim 1, wherein when the electronic device is connected to the host, the controller is further configured to:

read second data from the nonvolatile memory in accordance with a read command that is received from the host and designates the second logical address range, and transmit the read second data to the host, the second logical address range comprising the first logical address range and one or more logical addresses preceding or following the first logical address range; and write, to the nonvolatile memory, the second data received with a write command designating the second logical address range from the host.

10. The electronic device of claim 1, wherein when the electronic device is connected to the host, the controller is further configured to:

transmit, to the host, information that indicates a third logical address range corresponding to third data and a processing amount for turning a block comprising the third data into a block to which data is writable, wherein the third data is stored in the nonvolatile memory and is to be moved for data retention;

read the third data from the nonvolatile memory in accordance with a read command that is received from the host and designates the third logical address range, and transmit the read third data to the host; and write, to the nonvolatile memory, the third data that is received with a write command designating the third logical address range from the host.

11. The electronic device of claim 1, wherein when the electronic device is connected to the host, the controller is further configured to:

read the cold data from the nonvolatile memory;

issue, to a second electronic device, a write command for writing the read cold data that designates the first logical address range;

invalidate the cold data stored in the nonvolatile memory when the cold data is written to a second nonvolatile memory in the second electronic device in accordance with the issued write command; and notify the host that the cold data corresponding to the first logical address range is stored in the second electronic device.

12. An electronic device comprising:

a memory; and a processor configured to execute a program stored in the memory, wherein the processor is configured to:

receive information from a storage device that comprises a nonvolatile memory comprising blocks, wherein the information that indicates a first logical address range corresponding to cold data stored in the nonvolatile memory, and a processing amount for turning a cold block comprising the cold data into a block to which data is writable;

issue a read command designating the first logical address range to the storage device, and receive the cold data from the storage device; and issue, to the storage device, a write command for writing of the received cold data that designates the first logical address range.

13. The electronic device of claim 12, wherein the processor is configured to:

determine whether a current time is a time for executing a process for turning the cold block into a block to which data is writable based on the processing amount, an access frequency to the storage device, a period in which a resource of the electronic device is in a busy state, and/or an amount of processes under execution by the processor; and when the current time is the time for executing the process for turning the cold block into a block to which data is writable, issue a read command designating the first logical address range to the storage device, and receive the cold data from the storage device, and issue, to the storage device, a write command for writing the received cold data that designates the first logical address range.

14. The electronic device of claim 12, wherein the first logical address range is specified by a starting logical address of the first logical address range, and a number of logical blocks included in the first logical address range.

15. A computer system comprising:
a storage device; and
a host, wherein
the storage device comprises:
a nonvolatile memory comprising blocks; and
a controller electrically connected to the nonvolatile memory,
the host comprises:
a memory; and
a processor configured to execute a program stored in the memory,
the controller is configured to:
transmit information to the host, wherein the information that indicates a first logical address range corresponding to cold data stored in the nonvolatile memory, and a processing amount for turning a cold block that comprises the cold data into a block to which data is writable;
read the cold data from the nonvolatile memory in accordance with a read command that is received from the host and designates the first logical address range, and transmit the cold data to the host; and
write, to the nonvolatile memory, the cold data received with a write command designating the first logical address range from the host, and
the processor is configured to:
receive the information;
issue, to the storage device, a read command that designates the first logical address range, and receive the cold data from the storage device; and
issue, to the storage device, a write command for writing the received cold data that designates the first logical address range.

16. The computer system of claim 15, wherein the processor is configured to:
determine whether a current time is a time for executing a process for turning the cold block into a block to which data is writable based on the processing amount, an access frequency to the storage device, a period in which a resource of the host is in a busy state, and/or an amount of processes under execution by the processor; and
in a case where the current time is the time for executing the process for turning the cold block into a block to which data is writable,
issue, to the storage device, a read command that designates the first logical address range, and receive the cold data from the storage device, and issue, to the storage device, a write command for writing the received cold data that designates the first logical address range.

17. The computer system of claim 15, wherein the first logical address range is specified by a starting logical address of the first logical address range, and a number of logical blocks included in the first logical address range.

18. A control method of an electronic device that comprises a nonvolatile memory comprising blocks, the method comprising:
transmitting information to a host, wherein the information indicates a logical address range corresponding to cold data stored in the nonvolatile memory, and information that indicates a processing amount for turning a cold block that comprises the cold data into a block to which data is writable;
reading the cold data from the nonvolatile memory in accordance with a read command that is received from the host and designates the logical address range, and transmitting the read cold data to the host; and
writing, to the nonvolatile memory, the cold data that is received with a write command designating the logical address range from the host.

19. A control method comprising:
receiving information from a storage device that comprises a nonvolatile memory comprising blocks, wherein the information that indicates a logical address range corresponding to cold data stored in the nonvolatile memory, and information that indicates a processing amount for turning a cold block that comprises the cold data into a block to which data is writable;
issuing a read command designating the logical address range to the storage device;
receiving the cold data from the storage device; and
issuing, to the storage device, a write command for writing the received cold data that designates the logical address range.

20. A control method of a computer system that comprises a host and a storage device that comprises a nonvolatile memory comprising blocks, the method comprising:
transmitting information from the storage device to the host, wherein the information that indicates a logical address range corresponding to cold data stored in the nonvolatile memory, and a processing amount for turning a cold block that comprises the cold data into a block to which data is writable;
transmitting a read command designating the logical address range from the host to the storage device;
transmitting, to the host, the cold data read from the nonvolatile memory in accordance with the read command; and
transmitting a write command designating the logical address range from the host to the storage device; and
writing, to the nonvolatile memory, the cold data received with the write command.

* * * * *